(12) United States Patent
Sipolins et al.

(10) Patent No.: US 12,189,130 B1
(45) Date of Patent: Jan. 7, 2025

(54) SYSTEM AND METHODS FOR ENHANCED AR TRACKING VIA ADAPTIVE MEMS SCANNING MIRRORS

(71) Applicant: Adeia Imaging LLC, San Jose, CA (US)

(72) Inventors: Aldis Sipolins, Somerville, MA (US); Ning Xu, Irvine, CA (US)

(73) Assignee: Adeia Imaging LLC, San Jose, CA (US)

( * ) Notice: Subject to any disclaimer, the term of this patent is extended or adjusted under 35 U.S.C. 154(b) by 0 days.

(21) Appl. No.: 18/385,740

(22) Filed: Oct. 31, 2023

(51) Int. Cl.
| | | |
|---|---|---|
| *G06K 9/00* | (2022.01) | |
| *G02B 26/08* | (2006.01) | |
| *G02B 27/01* | (2006.01) | |
| *H04N 23/695* | (2023.01) | |
| *H04N 23/698* | (2023.01) | |

(52) U.S. Cl.
CPC ..... *G02B 27/0172* (2013.01); *G02B 26/0833* (2013.01); *G02B 27/0179* (2013.01); *H04N 23/695* (2023.01); *H04N 23/698* (2023.01); *G02B 2027/0138* (2013.01)

(58) Field of Classification Search
CPC ........ G02B 2027/0138; G02B 27/0179; G02B 26/0833; G02B 27/0172; H04N 23/698; H04N 23/695
See application file for complete search history.

(56) References Cited

U.S. PATENT DOCUMENTS

| | | | |
|---|---|---|---|
| 9,557,812 B2 * | 1/2017 | Maltz | G06F 3/013 |
| 11,076,200 B2 | 7/2021 | Gupta et al. | |
| 2017/0287221 A1 * | 10/2017 | Ghaly | G06T 7/70 |
| 2021/0303853 A1 | 9/2021 | Sun et al. | |

FOREIGN PATENT DOCUMENTS

EP 3014339 A1 5/2016

OTHER PUBLICATIONS

"Picoprojectors: Nanosecond modulation makes cell-phone projectors possible" https://www.laserfocusworld.com/optics/article/16555039/picoprojectors-nanosecond-modulation-makes-cell-phone-projectors-possible (7 pgs) (2008).

(Continued)

*Primary Examiner* — Abbas I Abdulselam
(74) *Attorney, Agent, or Firm* — Haley Guiliano LLP

(57) ABSTRACT

Systems, methods, and apparatuses are described for capturing panoramic images and positioning virtual objects on a device screen, using a device having a static camera and an adjustable camera. To generate a panoramic image, the device moves the field of view of the adjustable camera by moving a corresponding MEMS mirror. The device then captures a first image using the static camera, and a second image using the adjustable camera, and generates a panoramic image by combining the first and second images. To position a virtual object, the device captures a first image using the static camera, and determines that there are insufficient visual features in the first image for positioning. The device moves the field of view of the adjustable camera by moving the corresponding MEMS mirror, and captures a second image. Visual features from the second image are then used to position the virtual object.

20 Claims, 17 Drawing Sheets

(56) References Cited

OTHER PUBLICATIONS

Aditya Singh, "Top 5 Object Tracking Methods", https://medium.com/augmented-startups/top-5-object-tracking-methods-92f1643f8435 (16 pgs) (2021).

Admoni et al., "Social eye gaze in human-robot interaction: A review" Journal of Human-Robot Interaction, 6(1):25-63 (2017).

Bewley et al., "Simple Online and Realtime Tracking," 2016 IEEE International Conference on Image Processing (ICIP) Sep. 25-28, 2016.

Chris Rowlands, "What is a liquid lens? The tech that could revolutionize phone cameras explained" https://www.techradar.com/news/what-is-a-liquid-lens, 13 pgs. (2021).

https://preciseley.com/product/mems-scanning-mirror/ (5 pgs.).

https://www.canon-europe.com/pro/stories/vladimir-rys-using-eye-control-af/ retrieved from Internet Jan. 10, 2024.

Jain et al., "Gaze-driven Video Re-editing", ACM Transactions on Graphics, https://www.cise.ufl.edu/~ejain/videore-edit/ejain-gazedrivenvideo-tog.pdf, pp. 1-12 (2023).

Jon Porter, "Xiaomi teases camera with liquid lens on upcoming Mi Mix", https://www.theverge.com/2021/3/25/22350245/xiaomi-mi-mix-liquid-lens-autofocus-focal-length-camera (5 pgs) (2021).

Kumar B. N. et al., "GazeGuide: An Eye-Gaze-Guided Active Immersive UAV Camera", Applied Science, 2020, 10 (1668): 1-18 (2020).

Melanie Pinola, "Best Phone Cameras, There are lots of good phones, but these are tops for photos and videos" https://www.consumerreports.org/electronics-computers/cell-phones/best-smartphone-cameras-a2624660881/ (7 pgs) (2023).

Nourrit et al., "Head-Mounted Miniature Motorized Camera and Laser Pointer Driven by Eye Movements", Sensors. 23 (3503) 1-11 (2023).

Roland Udvarlaki, "Best smartphones with a periscope camera", https://pocketnow.com/best-smartphones-with-a-periscope-camera/ (20 pgs.) (2023).

Tilmon et al., "FoveaCam: A MEMS Mirror-Enabled Foveating Camera," 2020 IEEE International Conference on Computational Photography (ICCP), pp. 1-11, (2020).

Wang et al., "MEMS Mirrors for LiDAR: A Review", Micromachines 11(456): 1-24 (2020).

Wojke et al., "Simple online and realtime tracking with a deep association metric," IEEE International Conference on Image Processing (ICIP), pp. 17-20 (2017).

Zhang et al., "FairMOT: On the Fairness of Detection and Re-Identification in Multiple Object Tracking," International Journal of Computer Vision, 129: 3069-3087 (2021).

Zou et al., "Segment everything everywhere all at once", arXiv preprint arXiv:2304.06718v4, pp. 1-13 (2023).

U.S. Appl. No. 18/498,691, filed Oct. 31, 2023, Ning Xu.

U.S. Appl. No. 18/385,804, filed Oct. 31, 2023, Ning Xu.

* cited by examiner

SYSTEM AND METHODS FOR ENHANCED AR TRACKING VIA ADAPTIVE MEMS SCANNING MIRRORS

CROSS-REFERENCE TO RELATED APPLICATIONS

The disclosure of commonly owned application Ser. No. 18/498,691, filed Oct. 31, 2023 and entitled "SYSTEMS AND METHODS FOR ADJUSTING CAPTURE DIRECTION AND ZOOM OF A CAMERA BASED ON DETECTED GAZE," is hereby incorporated by reference herein in its entirety. In addition, the disclosure of commonly owned application Ser. No. 18/385,804, filed Oct. 31, 2023 and entitled "SYSTEM AND METHOD FOR EXPANDING FIELD OF VIEW IN MULTI-CAMERA DEVICES USING MEMS SCANNING MIRRORS," is hereby incorporated by reference herein in its entirety.

BACKGROUND

This disclosure relates to systems and methods for capturing images with a device using multiple cameras, one or more of which have an adjustable view direction, and to stitch the images together to generate a panoramic image. Some other embodiments relate to tracking and positioning a virtual object on a computing device screen, and using a camera with an adjustable view direction to capture tracking features not present in the main camera field of view (FoV). Embodiments may also relate to other features or functions.

SUMMARY

Some devices, such as smart phones, incorporate multiple rear-facing cameras. Each camera may be designed for a distinct purpose, such as standard photography, wide angle shots, and/or for capturing zoomed in images. However, these cameras are typically oriented in the same manner (e.g., oriented in parallel with each other), such that all the cameras' viewing angles or viewing directions are perpendicular to the back surface of the mobile device. This orientation may restrict the cameras' ability to work together to capture wide-angle, high-resolution images or videos.

In one approach, a mobile device may attempt to create an image with a wide FoV by instructing the user to capture multiple images using different viewing directions, and then stitching the images together to generate the resulting wide FoV image. This approach, however, requires manual capturing of overlapping images, and then complex processing to align and stitch the individual images together. This approach also requires relatively high precision from the user during the capturing of the individual images, to ensure that the images can be properly stitched together.

In another approach, a mobile device may operate in a "panorama mode" that generates a panoramic image from multiple images captured over time. However, when the user wishes to capture a panoramic image, the user is required to manually move the mobile device along a predetermined path while the camera(s) continuously capture individual images. For example, the mobile device display may present an arrow for the user to follow as he or she moves the mobile device horizontally from left to right or right to left, or vertically up to down or down to up, depending on the mobile device orientation. The mobile device then stitches together the images captured by the fixed view direction camera(s) during the movement of the mobile device, to generate the resulting panoramic image. However, this approach requires the user to maintain a steady movement of the mobile device, or else risk producing a panoramic image that is warped, missing information, has uneven quality, or is otherwise not a desirable panoramic image. This approach also still requires complex processing to stitch the images together, because the images are all taken using the same camera(s) at different points in time, with a variable movement between the images caused by the user moving the mobile device.

To help overcome these issues, systems, methods, and apparatuses are described herein for receiving an indication to capture a panorama by a device comprising a display, a static camera having a static view direction, and at least one adjustable camera having an adjustable view direction. This device may be a mobile device such as a smartphone. The systems, methods, and apparatuses described herein may move the adjustable view direction of the at least one adjustable camera away from the static view direction of the static camera. The systems, methods, and apparatuses described herein may then capture a first image using the static camera, and capture a second image using the at least one adjustable camera. The systems, methods, and apparatuses described herein may then generate a panoramic image using the first image and the second image from the static camera and the at least one adjustable camera.

Such aspects enable the mobile device to capture images and video with a wide FoV. The multi-camera design may incorporate Micro-Electro-Mechanical Systems (MEMS) based scanning mirrors, positioned centrally in front of the one or more adjustable camera lenses, to dynamically adjust the viewing directions with 2 degrees of freedom. This enables the mobile device to modify the viewing angles of the cameras, thus enabling various desired functionalities described in this disclosure. For example, in situations where a larger FoV is desirable, the control unit can direct the MEMS mirrors to adjust the viewing angles of the different cameras. This allows the multiple cameras to capture images from various directions simultaneously, so that their FoVs can be combined. The resulting images can then be seamlessly stitched together to produce a single high-resolution image with an expanded FoV beyond that available via a single camera or multiple cameras with parallel viewing directions.

In some examples, the indication to capture the panorama comprises an input to a user interface of the device selecting a panorama option. This may include presenting an option via the user interface (e.g., options may include normal mode, panorama mode, video mode, etc.), and receiving a selection of the panorama option. The device may then enter the panorama mode in which the device is prepared to reorient one or more cameras, to capture and stitch together images from the cameras.

In some examples, the systems, methods, and apparatuses provided herein may further include using the orientation of the device as a trigger. For instance, the device may determine that the device is oriented in a first orientation (e.g., oriented horizontally), and identify that determination as the received indication to capture the panorama. For example, the device may automatically enter the panorama mode upon detecting that the device is in the first orientation, or has transitioned into the first orientation from another orientation.

In some examples, the at least one adjustable camera may have an adjustable view direction based on an orientation of a micro-electro-mechanical system (MEMS) mirror. That is, the at least one adjustable camera may include a MEMS mirror configured to rotate or move with two degrees of freedom. The device may thereby control the adjustable view direction of the at least one adjustable camera by controlling the MEMS mirror to change from a first orientation to a second orientation.

In some examples, the systems, methods, and apparatuses provided herein may be further configured to move the adjustable view direction of the at least one adjustable camera in response to detecting a portion of an object of interest in a scene captured by the static camera. That is, the device may move the adjustable view direction of the at least one adjustable camera such that a field of view of the at least one adjustable camera includes more of the object of interest than a field of view of the static camera. When a user attempts to take an image of an object of interest (e.g., the Golden Gate Bridge), the device may identify that the main or static camera FoV does not capture the object of interest very well. The device may then adjust the FoV of the adjustable camera to capture more of the object of interest, such that the combined FoV of the static camera and the adjustable camera capture the entire object of interest.

In some examples, moving the adjustable view direction of the at least one adjustable camera comprises moving the adjustable view direction of the at least one adjustable camera such that a field of view of the at least one adjustable camera is adjacent to a field of view of the static camera. For instance, the device may move the adjustable view direction at least one adjustable camera such that an edge of the FoV of the at least one adjustable camera aligns with the edge of the FoV of the static camera, so that the combined FoV is equal to the FoV of the static camera added to the FoV of the at least one adjustable camera. In this case, there may be an overlap between the FoVs of the adjustable and static cameras to enable stitching of the images captured by the respective cameras. Alternatively, the FoVs may be entirely separate (i.e., the FoVs do not overlap), if the system is calibrated such that when the adjustable camera FoV moves, the adjustable camera has an identical optical center to the static camera.

In some examples, the systems, methods, and apparatuses provided herein may be further configured to move the adjustable view direction of the at least one adjustable camera to a plurality of view directions. The device may then capture a plurality of images corresponding to the plurality of view directions by, for each of the plurality of view directions of the at least one adjustable camera, capturing a respective image. The device may then generate the panoramic image based on the plurality of images corresponding to the plurality of view directions of the at least one adjustable camera.

In some examples, the systems, methods, and apparatuses provided herein may be further configured to provide a prompt by the device to pan the device horizontally from a first orientation to a second orientation. As the device pans horizontally from the first orientation to the second orientation, the device may capture a first plurality of images with the static camera, and capture a second plurality of images with the at least one adjustable camera, wherein the adjustable view direction (i.e., the view direction of the adjustable camera) remains at a constant offset from the static view direction (i.e., the view direction of the static camera). The device may then generate the panoramic image using the first plurality of images and the second plurality of images.

In some examples, the systems, methods, and apparatuses provided herein may be further configured to provide a prompt by the device to tilt the device vertically from a first orientation to a second orientation. As the device tilts vertically from the first orientation to the second orientation, the device may capture a first plurality of images with the static camera, and capture a second plurality of images with the at least one adjustable camera, wherein the adjustable view direction (of the adjustable camera) remains at a constant offset from the static view direction (of the static camera). That is, the respective view directions of the adjustable and static cameras remain fixed relative to each other. The device may then generate the panoramic image using the first plurality of images and the second plurality of images.

In some examples, the device may include two adjustable cameras. The first adjustable camera may have a first adjustable view direction, and the second adjustable camera may have a second adjustable view direction. In some examples, the device may move the first adjustable view direction of the first adjustable camera away from the static view direction of the static camera in a first direction, and moving the second adjustable view direction of the second adjustable camera away from the static view direction of the static camera in a second direction, wherein the second direction is opposite the first direction. The device may then capture images using the first and second adjustable cameras, and the static camera. The combined FOV of these three cameras may provide a panoramic view, without the need to physically move the device.

Other embodiments of this disclosure relates to visual tracking using adaptive MEMS scanning mirrors. Many technologies rely on visual tracking, which requires the robust detection of visual features in the FoV of a camera. For example, placing a virtual object in an augmented reality (AR) context on a screen (e.g., Pokemon Go™) typically requires detection and tracking of visual features in the camera's FoV to position and track the virtual object. These visual features often take the form of edges, transitions, and/or contrast between objects within the camera's FoV. Unfortunately, when the camera's FoV includes a surface that lacks sufficient features (e.g., a blank wall), the device has a difficult if not impossible task of positioning the virtual object without any frame of reference beyond the device's inertial sensors, which may not be sufficiently reliable for tracking. For example, solid color walls or highly reflective surfaces such as mirrors can severely disrupt the tracking capability of the camera and any system dependent on visual odometry. This problem is especially disruptive to augmented reality (AR), where consistent and accurate tracking of the environment is crucial for user comfort and immersion.

In one approach, the camera captures a video of the scene within its field of view, for instance at 30 frames per second. Each of these frames is then processed by a feature detection algorithm that identifies the locations of these unique features within the frame. Once these features are identified, the algorithm monitors how these features shift from one frame to the next, effectively tracking their movements across frames. This tracking process allows the system to understand and interpret changes in the scene, including the movement of objects or the camera itself. The accuracy of this tracking process depends on the number and reliability of identifiable features. As such, this approach has drawbacks, particularly when used in an environment in which features are sparse or non-existent (e.g., a solid colored wall). In these cases, the visual tracking system struggles to maintain accurate tracking.

To help overcome this problem, systems, methods, and apparatuses are disclosed herein for causing a device to receive an indication to place an augmented reality (AR) object on a screen of the device, the device comprising a static camera having a static view direction and at least one adjustable camera having an adjustable view direction. The device captures a first image using the static camera, and attempts to place the AR object on the screen of the device using any features identified in the first image. However, in response to determining that the first image lacks sufficient positioning cues (or features) for reliable placement of the AR object, the device moves the adjustable view direction of the at least one adjustable camera from a first direction to a second direction, and captures a second image using the at least one adjustable camera in the second direction. The device then identifies additional positioning cues using the second image, and generates for display on the screen of the device the AR object in a position on the screen of the device determined at least in part based on positioning cues from the second image.

Such aspects enable the cameras of the device, one being a static camera and one being an adjustable camera, to work in tandem to enhance visual tracking in environments with sparse visual features. MEMS mirrors operate along with the adjustable camera to scan the surrounding environment when the primary camera (i.e., static camera) is facing an area of the environment with insufficient feature points or positioning cues. This scanning process identifies regions in the environment outside the primary camera's field of view that have trackable visual features. The captured images from these additional regions are then integrated into the primary camera's tracking algorithm, thereby supplementing the tracking data and improving tracking performance. This process operates seamlessly in the background, improving the user experience by enhancing tracking accuracy and stability in AR applications and similar technologies that rely on visual odometry.

In some examples, the at least one adjustable camera includes a micro-electro-mechanical system (MEMS) mirror, and moving the adjustable view direction of the at least one adjustable camera comprises controlling the MEMS mirror to change from a first orientation to a second orientation.

In some examples, the device may move the adjustable view direction of the at least one adjustable camera in a random direction in order to search for additional positioning cues or trackable visual features. Alternatively, the device may move the adjustable view direction of the at least one adjustable camera in a predetermined direction based on data from one or more other sensors of the device.

In some examples, the systems, methods, and apparatuses provided herein may be further configured to determine that the second image captured by the at least one adjustable camera in the second direction includes sufficient positioning cues for placement of the AR object, and store the second direction for later use. The stored second direction may be associated with a tag or marker indicating that moving the adjustable view direction to this second direction resulted in an image with sufficient positioning cues. It should be appreciated that in this disclosure, "sufficient" positioning cues of trackable visual features may be understood in a number of ways. Tracking accuracy may be quantified in terms of distance error (e.g., 5 mm). While there may be no universally accepted "sufficiently low" amount of tracking error (or "sufficient" number of positioning cues), a developer may or may not include a minimum tracking error and desired tracking accuracy requirement. Thus, the term "sufficient" should be understood as a threshold that enables the corresponding tracking algorithm or other program/application making use of the positioning cues to operate effectively.

In some examples, the systems, methods, and apparatuses provided herein may be further configured to, in response to receiving a second indication to place a second AR object on the screen of the device, move the adjustable view direction of the at least one adjustable camera to the stored second direction. After moving the camera to the stored second direction, the device may capture a third image using the at least one adjustable camera directed in the stored second direction, generate for display the second AR object in a second position on the screen of the device determined at least in part based on positioning cues from the third image.

In some examples, the systems, methods, and apparatuses provided herein may be further configured to determine that the device has moved from a first location to a second location (or first orientation to a second orientation). The device may then determine a difference between the first location and the second location using information gleaned from the camera(s), and or using dead reckoning or another non-camera based source of information such as inertial sensors and/or GPS. And in response to receiving a second indication to place a second AR object on the screen of the device located in the second location, the device may move the adjustable view direction of the at least one adjustable camera to a third direction, wherein the third direction is based on the stored second direction and the difference between the first location and the second location, and capture a third image using the at least one adjustable camera in the third direction. The device may then generate for display the second AR object in a second position on the screen of the device determined at least in part based on positioning cues from the third image.

In some examples, moving the adjustable view direction of the at least one adjustable camera comprises sampling a plurality of different view directions of the at least one adjustable camera, and storing the plurality of different view directions in a ranked list. The plurality of different view directions may be ranked based on a number of positioning cues detectable in images captured by the at least one adjustable camera when positioned in each respective view direction of the plurality of different view directions. This enables the device to determine and rank the best directions in a given environment for the adjustable camera to be directed in order to capture the maximum number and quality of positioning cues. So even the environment has a lot of featureless surfaces (e.g., a large empty room), the device may identify and store the direction of a window frame or other feature-rich view for use in positioning and tracking. Furthermore, in some examples, moving the adjustable view direction of the at least one adjustable camera further comprises selecting a best ranked view direction of the plurality of different view directions stored in the ranked list, and moving the adjustable view direction of the at least one adjustable camera to the best ranked view direction.

In some examples, moving the adjustable view direction of the at least one adjustable camera comprises rotating the adjustable view direction of the at least one adjustable camera between the second direction (which was already determined to include sufficient positioning cues) and a plurality of additional view directions. That is, the device may move the at least one adjustable camera to scan for a better viewing direction by moving the camera and capturing images using the at least one adjustable camera in each of the second direction and the plurality of additional view directions. The device may then, in response to determining that a third direction of the plurality of additional view directions provides a greater number of positioning cues than the second direction, capture the second image using the at least one adjustable camera in the third direction. That is, the device may continuously search for better view directions that provide the best positioning cues (e.g., greatest number and quality of positioning cues, largest spread of positioning cues within the image, or other metric).

In some examples, the systems, methods, and apparatuses provided herein may be further configured to determine that the first image captured by the static camera includes sufficiently trackable visual features for positioning the AR object on the screen of the device. And in response, the device may move the adjustable view direction of the at least one adjustable camera such that a field of view of the at least one adjustable camera is outside the field of view of the static camera. That is, the device may proactively search for the best view direction for virtual object placement, even if the static camera FoV already includes sufficient positioning cues. The device may move the adjustable view direction of the at least one adjustable camera to search for additional positioning cues in anticipation of movement of the static camera FoV away from its current view direction having sufficient positioning cues to a different view direction that lacks positioning cues.

BRIEF DESCRIPTION OF THE DRAWINGS

The present disclosure, in accordance with one or more various embodiments, is described in detail with reference to the following figures. The drawings are provided for the purposes of illustration only and merely depict typical or example embodiments. These drawings are provided to facilitate an understanding of the concepts disclosed herein and should not be considered limiting of the breadth, scope, or applicability of these concepts. It should be noted that, for clarity and ease of illustration, these drawings are not necessarily made to scale.

DETAILED DESCRIPTION

Figure 1:
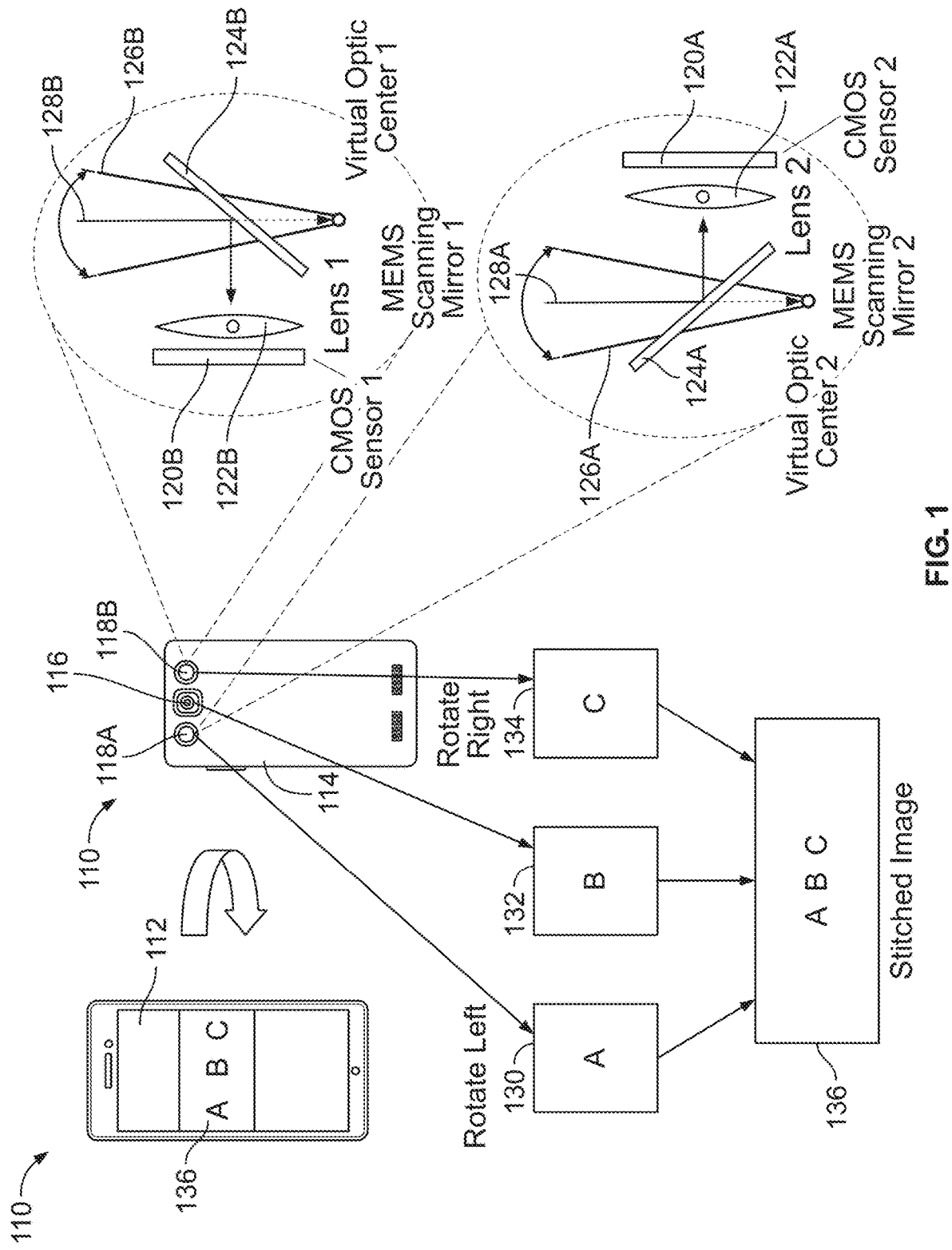
FIG. 1 depicts an illustrative block diagram and process for taking a panoramic image using multiple cameras, including at least one adjustable camera, in accordance with some embodiments of this disclosure.

FIG. 1 depicts an example process for capturing a panoramic image or taking a panoramic video using a device 110 having multiple cameras. In some situation it may be beneficial or desirable to capture images or video with a larger FoV than would be possible using a single camera. In these cases, a device having an adjustable camera such as is described herein may direct a MEMS mirror of the adjustable camera to move the viewing angle or viewing direction of cameras to allow for a greater overall FoV. This allows multiple cameras to capture images while pointed in various directions simultaneously, so that their FoVs can be combined. The resulting images can then be seamlessly stitched together to produce a single high-resolution shot with an expanded FoV. This mechanism may be especially advantageous when capturing panoramas.

As shown in FIG. 1, a device 110 may include a display 112, a rear side 114, a static camera 116, and first and second adjustable cameras 118A and 118B. As shown in FIG. 1, the device 110 is a smart phone. However, in some examples, the device 110 may comprise or correspond to a head-mounted computing device; mobile device such as, for example, smartphone or tablet; a camera; a camera array; a laptop computer; a personal computer; a desktop computer; a smart television; a smart watch or wearable device; smart glasses; a stereoscopic display; a wearable camera; extended reality (XR) glasses; XR goggles; an XR head-mounted display (HMD); near-eye display device; any other suitable computing device; or any combination thereof.

Each of the adjustable cameras 118A and 118B may comprise an image sensor 120A, 120B, a lens 122A, 122B, and a MEMS mirror 124A, 124B. Adjustable cameras 118A, 118B have respective fields of view 126A, 126B and respective view directions 128A, 128B. Device 110 may comprise, be attached to, be incorporated in, and/or otherwise be in communication with cameras 116, 118A, 118B, and/or one or more other cameras. The image sensors of cameras 116, 118A, and/or 118B may comprise a charge-coupled device (CCD); a complementary metal-oxide semiconductor (CMOS); or any other suitable sensor (e.g., optical sensors); or any suitable combination thereof. In some embodiments, camera 116 and/or 118A and 118B may comprise a camera direction control element (e.g., including microelectromechanical systems (MEMS) scanning mirror 124A and 124B) for controlling a capturing direction of the camera, and a camera zoom control element for controlling zoom of the camera. Cameras 116, 118A, and/or 118B may be outward facing cameras configured to capture images and/or video of environment proximate to device 110.

In some embodiments, an image capture application may be executed at least in part on device 110 and/or cameras 116, 118A, and 118B, and/or at one or more remote servers and/or at or distributed across any of one or more other suitable computing devices, in communication over any suitable number and/or types of networks (e.g., the Internet). The image capture application may be configured to perform the functionalities (or any suitable portion of the functionalities) described herein. In some embodiments, the image capture application may be a stand-alone application, or may be incorporated as part of any suitable application, e.g., XR applications, video or image or electronic communication applications, social networking applications, image or video capturing and/or editing applications, image analysis applications, or any other suitable application(s), or any combination thereof.

In some embodiments, the image capture application may be understood as middleware or application software or any combination thereof. In some embodiments, the image capture application may be considered as part of an operating system (OS) of device 110 and/or as part of an OS of cameras 116, 118A and 118B, or separate from the OS of device 110 and cameras 116, 118A, and 118B. The OS may be operable to initialize and control various software and/or hardware components of computing device 110. The image capture application may correspond to or be included as part of an image capture system, which may be configured to perform the functionalities described herein.

In some embodiments, the image capture application may be installed at or otherwise provided to a particular device, may be provided via an application programming interface (API), or may be provided as an add-on application to another platform or application. In some embodiments, software tools (e.g., one or more software development kits, or SDKs) may be provided to any suitable party, to enable the party to implement the functionalities described herein.

The image capture application may receive input to begin capturing images or video of an environment. The input may be received in any suitable form, e.g., as voice input, tactile input, input received via a keyboard or remote, input received via a touchscreen, text-based input, biometric input, or any other suitable input, or any combination thereof. In some embodiments, a field of view (FOV) of a portion of the environment at a given time is presented to a user via the display 112.

In some embodiments, the content displayed on display 112 may correspond to a preview of an image or video capable of being captured and stored by device 110 and/or cameras 116, 118A and 118B, such as if suitable input is received from a user instructing an image to be captured. In some embodiments, such content may be continuously updated in real time as objects, persons, users and/or entities in the environment change locations or change their appearance or otherwise change. For example, device 110 may update the display of the environment captured by camera 116 as the objects or users move about the environment and/or as the FoV of camera 116 changes.

In some embodiments, the image capture application may activate camera 116, 118A, and/or 118B, and/or may provide display 112, based on receiving input from a user, e.g., selection of a particular button or option and/or a request to access a camera of device 110; based on voice input received at a microphone of device 110; based on detecting that device 110 and/or cameras 116, 118A, and/or 118B are oriented in a desired direction; based on detecting that an image sensor of one or more of cameras 116, 118A, and/or 118B is capturing visual content; and/or based on any other suitable input or criteria. In some embodiments, the user may be holding device 110, or the user may be wearing device 110, or the user may have mounted cameras 116, 118A, and/or 118B on a tripod or other object. In some embodiments, the image sensors of one or more of cameras 116, 118A, and/or 118B may be configured to automatically track one or more entities or objects in the environment captured by the respective camera.

As noted above, it may be desirable to capture a panoramic or wide FoV image or video. FIG. 1 illustrates an example wherein a panoramic image is captured. Referring to FIG. 1, an initial step includes receiving an input or indication at the device 110 to capture the panoramic image. In response, the device 110 may cause the adjustable cameras 118A and 118B to move such that their respective adjustable view directions and/or FoVs are move away from each other in opposite directions, and each move away from the static view direction of static camera 116. The FoV of the combined cameras of device 110 is thereby expanded to cover a larger portion of the environment. In some examples, moving the adjustable view directions of the adjustable cameras 118A and 118B includes causing the respective MEMS mirrors (124A and 124B) to rotate or otherwise change their orientations. This causes the respective view directions 128A and 128B of the adjustable cameras 118A and 118B to move.

The device 110 and/or image capture application controlling the operation of the device 110 then causes the first adjustable camera 118A to capture image 130, causes the static camera 116 to capture image 132, and causes the second adjustable camera 118B to capture image 134. Images 130, 132, and 134 may be partially overlapping. The device 110 and/or image capture application then stitches images 130, 132, and 134 together to generate a panoramic image 136. This stitching may be done in any suitable manner, such as by identifying features from each image and using those identified features to align the images. The device 110 then displays the generated panoramic image 136 on the display 112.

Figure 2B:
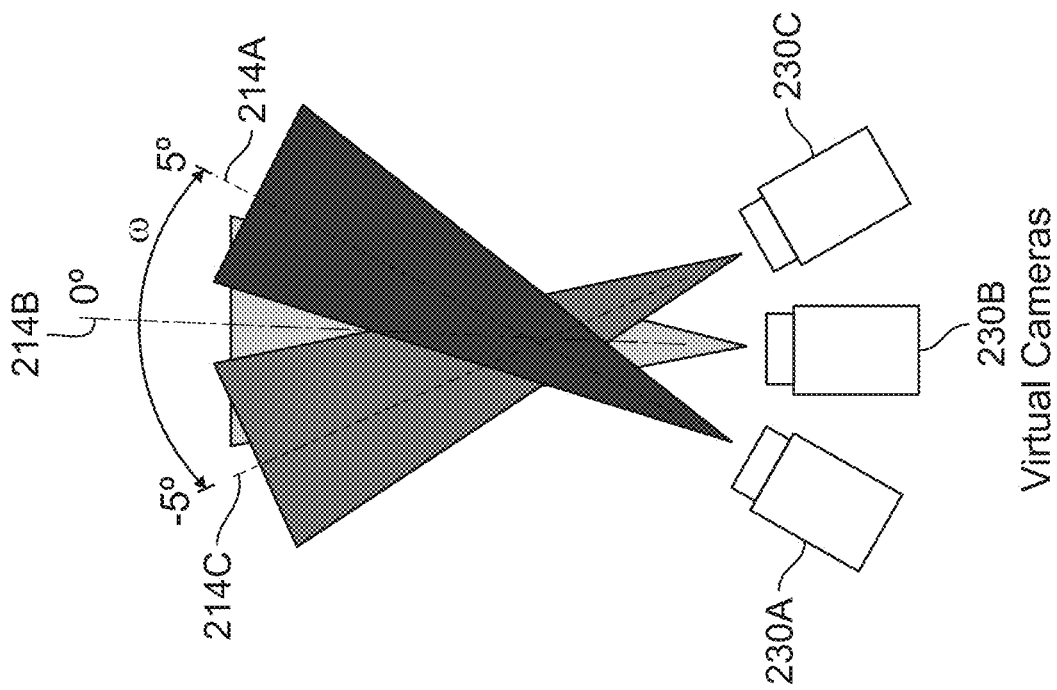
FIG. 2B depicts a schematic diagram showing the relative positioning of the virtual camera of FIG. 2A in three locations, based on movement of the MEMS mirror in three different orientations, in accordance with some embodiments of this disclosure.
Figure 2A:
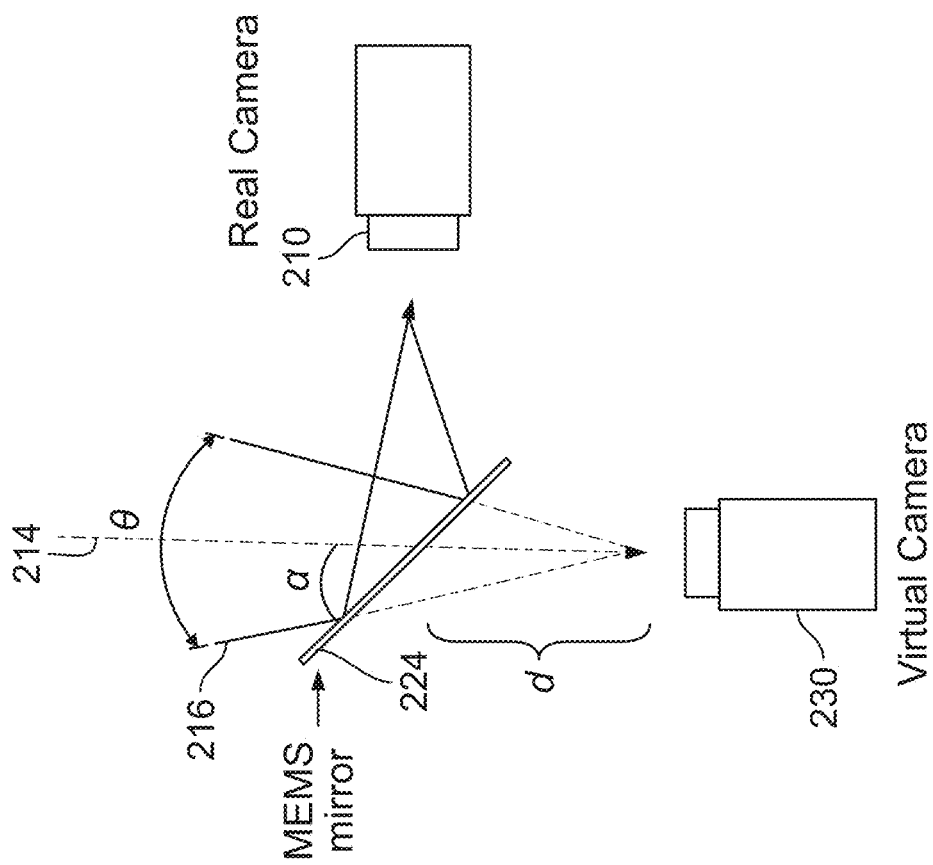
FIG. 2A depicts a schematic diagram of the orientation of an adjustable camera and the corresponding virtual camera, based on the positioning of the MEMS mirror, in accordance with some embodiments of this disclosure.

FIG. 2 shows a simplified arrangement of how the adjustable cameras 118A and/or 118B operate to change the adjustable view direction of the camera, in accordance with some embodiments of this disclosure. FIG. 2 illustrates certain components or aspects of the cameras for purposes of understanding how the view direction changes, but it should be appreciated that each camera may include additional components or aspects. The operation of adjustable cameras 118A and/or 118B may be described with respect to FIGS. 1, 2A, and 2B.

As noted above, each adjustable camera 118A and/or 118B may include an image sensor 120A, 120B, a lens 122A, 122B, and a MEMS mirror 124A, 124B. FIG. 2 illustrates a camera 210 (which may include an image sensor (not labeled) and a lens (not labeled). FIG. 2A also illustrates a MEMS mirror 224, which may be similar or identical to the MEMS mirrors 124A, 124B shown in FIG. 1.

Camera 210 may be configured to receive light from its surrounding environment based on the light reflecting off MEMS scanning mirror 224 towards a lens of the camera 210. The image sensor of camera 210 may detect received light and generate image data based on the detected light by converting the detected light comprising photons into electrical signals. In some embodiments, the camera 210 may comprise multiple image sensors, e.g., at least one image sensor configured to receive light and generate images from a scene.

In some embodiments, the image data generated by the image sensor may be an analog output and digitized at analog-to-digital converter for processing at a controller. In some embodiments, the controller may execute the image capture application or may otherwise be instructed by the image capture application to cause capturing of images or video of a scene, analyze or operate on pixels of the captured images or video and/or determine or receive data regarding objects of interest in the captured images or video, control the various components of the camera 210, and determine (or otherwise be instructed by the image capture application) desired zoom and capturing direction parameters to which the current parameters of the image capture are to be adjusted. In some embodiments, the controller may cause a captured image or video to be stored in memory and/or the controller may comprise input/output circuitry for causing a captured image or video to be transmitted to another computing device and/or to be transmitted via a communication network.

In some embodiments, the lens (e.g., lenses 122A, 122B) may correspond to or be included in a camera zoom control element for controlling zoom of camera. The lens may comprise any suitable number of lenses which may correspond to one or more of any suitable type of lens, e.g., ophthalmic lenses such as a concave lens or convex lens. In some embodiments, the lens may be a periscope lens, and may be front facing or rear facing.

In some embodiments, MEMS scanning mirror 224 (and/or 122A, 122B) may correspond to or be included in a camera direction control element for controlling a capturing direction of the camera, to rapidly adjust viewing directions of the camera 210, 118A, and/or 118B, which may be an outwardly facing scene proximate to the camera. The MEMS scanning mirror 224, 124A, and/or 124B may be a miniature device that uses microfabricated mechanical structures to control the reflection and direction of incoming light, and the mirror may rapidly oscillate or tilt in one or two axes (1D or 2D scanning) to steer a light beam across a surface of the camera's image sensor. For example, a pan and/or tilt angle (a) may be modified using an electrical signal from a controller controlling the orientation of the MEMS mirror 224.

Due to the reflection of light onto the camera 210 from the MEMS mirror 224, the system operates as though the camera were actually positioned behind the MEMS mirror 224 at the position of the virtual camera 230. That is, while the image sensor of the real camera 210 is positioned to the side and light is reflect off the mirror 224, the virtual camera 230 reflects the position of the image sensor as if the MEMS mirror did not exist. By including the MEMS mirror, the actual depth of the camera system can be reduced, because the image sensor can be positioned to the side of the MEMS mirror. The use of the MEMS mirror 224 and side positioning of the camera 210 and its image sensor enables the camera to capture images as though the image sensor was positioned behind the mirror 224 at a depth (d). However, due to the relatively thin nature of many modern devices (e.g., smart phones), this depth (d) can be problematic. As such, by positioning the image sensor to the side, a larger effective focal length can be achieved without requiring a thick device.

Additionally, the MEMS mirror 224 can rotate or change its orientation to change the effective position of the virtual camera 230. FIG. 2B illustrates that when the MEMS mirror 224 is moved, the corresponding view direction of the camera 210 changes correspondingly. That is, when the MEMS mirror 224 is moved to a first orientation, the corresponding first virtual camera is positioned at position 230A, and the resulting view direction is 214A. When the MEMS mirror 224 is moved to a second orientation, the corresponding second virtual camera is positioned at position 230B, and the resulting view direction is 214B. And when the MEMS mirror 224 is moved to a third orientation, the corresponding third virtual camera is positioned at position 230C, and the resulting view direction is 214C. A change in the angle α may correspond to or correlate with a change the view direction angle (ω) shown in FIG. 2B.

The combination of the image sensor and MEMS scanning mirror 224 enables the image capture application to employ real-time control to rapidly respond to changing conditions and capture an optimal image or video of the environment surrounding the user.

Figure 3A:
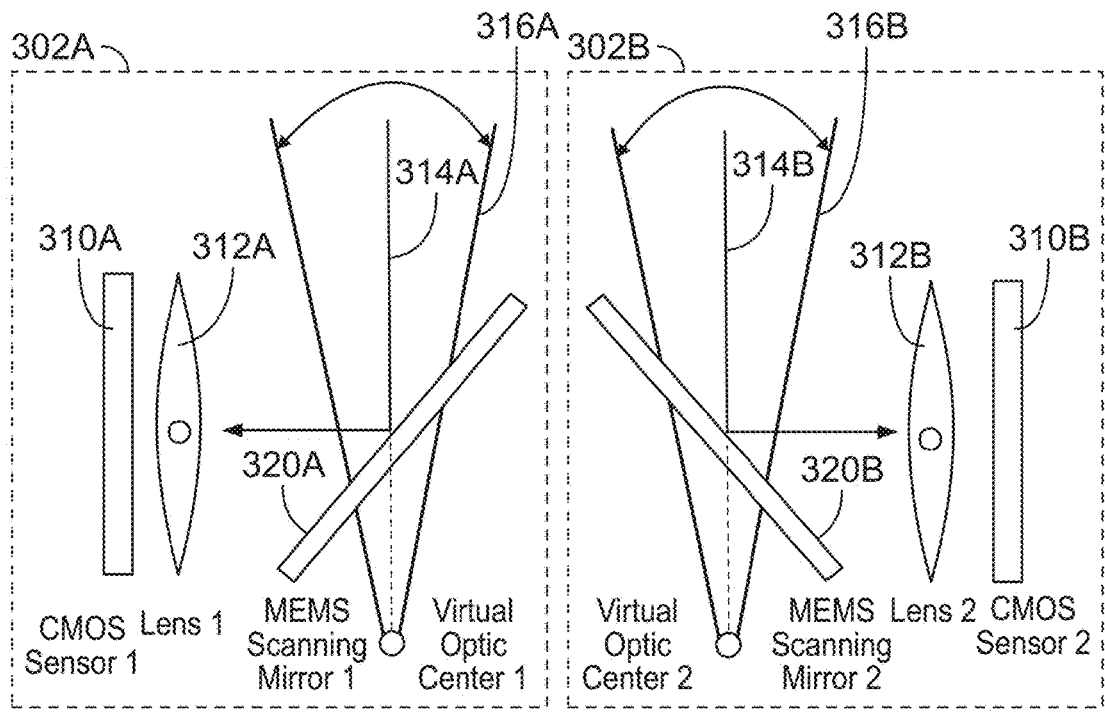
FIGS. 3A and 3B show illustrative diagrams of first and second adjustable camera systems with the MEMS mirrors in first positions (FIG. 3A) and in second positions (FIG. 3B), in accordance with some embodiments of this disclosure.
Figure 3B:
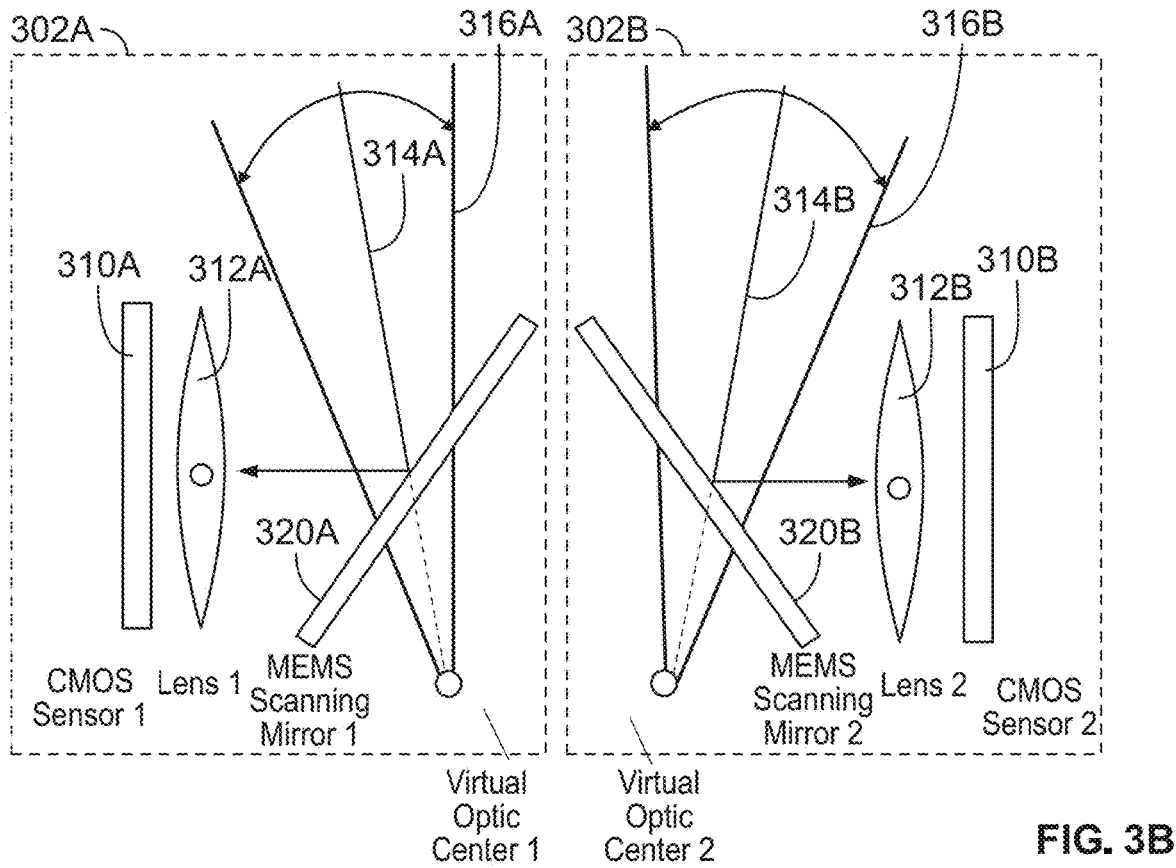

FIGS. 3A and 3B illustrate first and second adjustable cameras 302A, 302B with the MEMS mirrors 320A,320B in first positions (FIG. 3A) and in second positions (FIG. 3B), in accordance with some embodiments of this disclosure. Adjustable cameras 302A,302B may be similar or identical to cameras 118A and 118B. As shown in FIGS. 3A and 3B, adjustable cameras 302A,302B each includes an image sensor 310A,310B, a lens 312A,312B, a MEMS mirror 320A,320B, has a FoV 316A,316B, and has an adjustable view direction 314A,314B.

As shown in FIG. 3A, each camera 302A,302B is equipped with a MEMS scanning mirror 320A,320B positioned in front of its lens 312A,312B. The mirrors function to redirect the optical centers, simulating the effect of two rear-facing cameras arranged side by side. In this configuration, both cameras 302A,302B have parallel viewing directions 314A,314B. When the MEMS scanning mirrors maintain this position, the behavior of the two-camera system aligns with that of a traditional rear-facing, side-by-side camera system.

In FIG. 3B, the mirror position controller or camera direction control element controls the positioning of the mirrors 320A,320B to re-direct the fields of view of the two cameras away from being parallel, thereby facilitating the creation of a larger, combined field of view upon stitching the images captured from both cameras. As demonstrated in FIG. 3B, the MEMS scanning mirrors 320A,320B are maneuvered such that they guide the two cameras 302A, 302B to capture different angles. This setup results in a larger, combined field of view upon the execution of image stitching. Here, the left mirror 320a is adjusted toward the image sensor 310A, enabling the camera to capture the left-hand segment of the combined field of view. Conversely, the right mirror 320B is manipulated to guide the right camera toward the right-hand segment of the combined field of view. The FoVs 316A,316B may still overlap in part, which may be used to stitch the captured images together.

Figure 4:
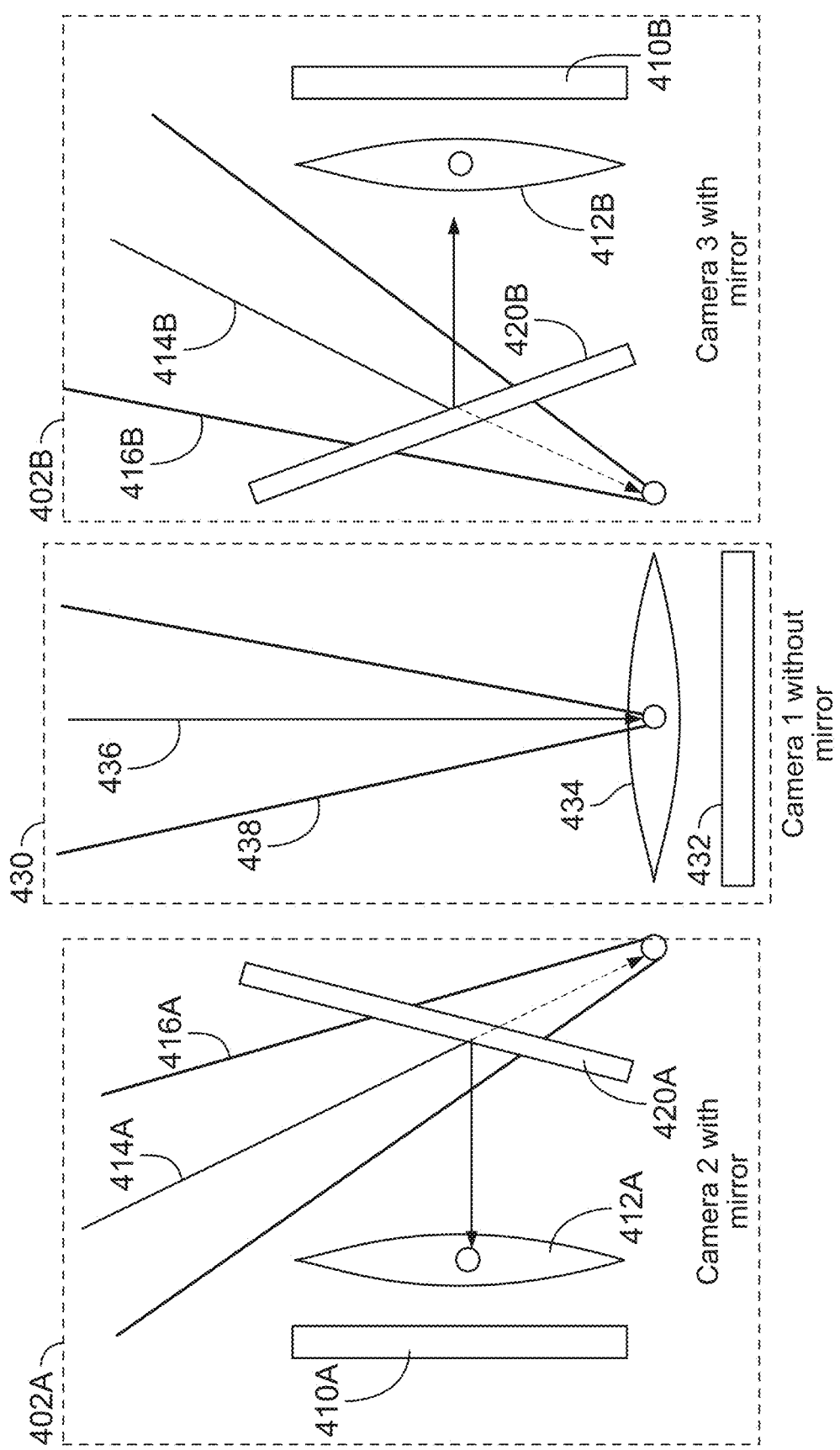
FIG. 4 shows an illustrative diagram of first and second adjustable camera systems and a static camera, in accordance with some embodiments of this disclosure.

FIG. 4. Illustrates a device having three cameras including two adjustable cameras 402A and 402B, and a static camera 430. Each adjustable camera may be similar or identical to cameras 118A, 118B, 302A, and 302B described above, and may include an image sensor 410A,410B, a lens 412A, 412B, a MEMS mirror 420A,420B, may have a FoV 416A, 416B, and may have an adjustable view direction 414A, 414B. The static camera may be similar or identical to camera 116 described above, and may include an image sensor 432, a lens 434, may have a FoV 438, and may have a static view direction 436.

Similar to FIG. 3B, FIG. 4 illustrates that adjustable cameras 402A,402B can be controlled such that their respective adjustable view directions 414A,414B are angled away from the static view direction 436 of the static camera 430. In a default mode or default state, the view directions 414A, 414B, and 436 may be parallel. However when a wide FoV image is desired, the MEMS mirrors 420A,420B may be actuated such that the adjustable view directions 414A,414B of the adjustable cameras are no longer parallel, and move to capture respective FoVs 416A and 416B that include portions of the environment outside that visible to the FoV 438 of the static camera 430. In some examples, the adjustable view directions 414A and 414B may be moved such that the respective FoVs of the adjustable cameras and the static camera are non-overlapping, are adjacent to each other, partially overlap, and/or a combination of these.

Figure 5:
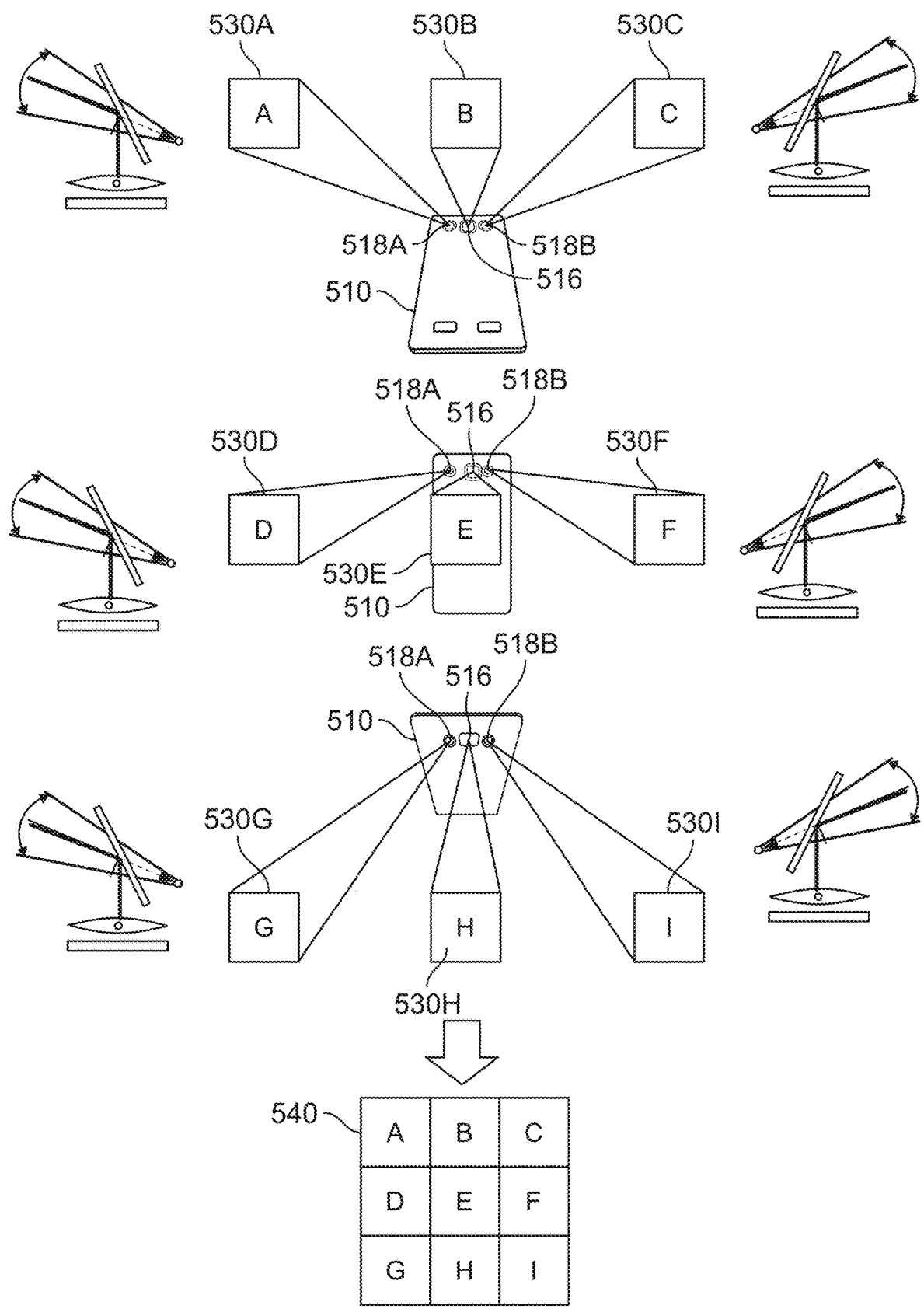
FIG. 5 shows an illustrative series of diagrams depicting images taken by a device in three different orientations, the device having first and second adjustable cameras and a static camera, in accordance with some embodiments of this disclosure.
Figure 6:
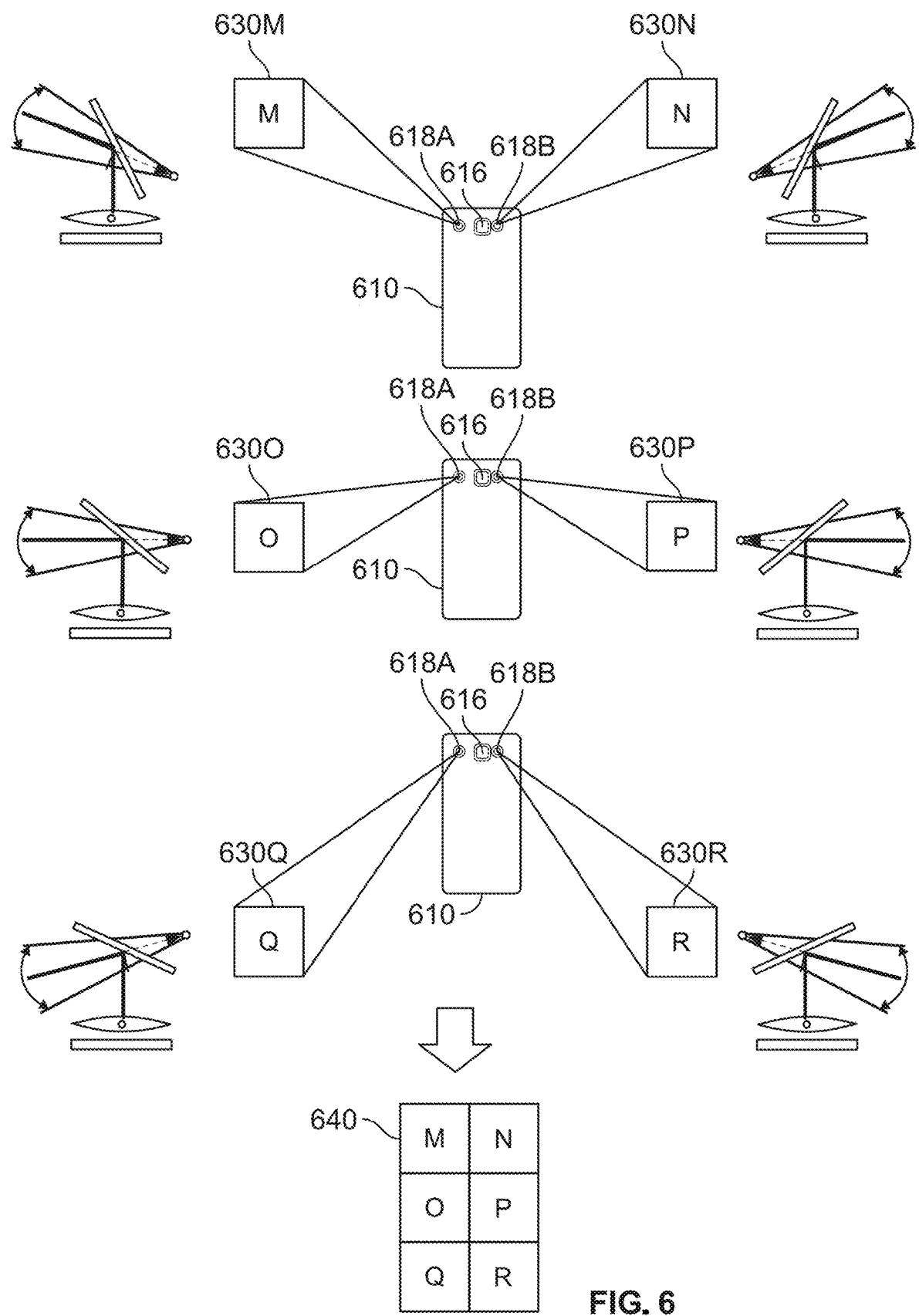
FIG. 6 depicts an illustrative series of diagrams depicting images taken by a device in a first orientation, the device having first and second adjustable cameras configured to take images in three different viewing directions without changing the orientation of the device, in accordance with some embodiments of this disclosure.

Referring now to FIGS. 5 and 6, two different scenarios for capturing a panoramic image are described. In FIG. 5, the user of device 510 moves the device through a plurality of different orientations in order to capture the panoramic image. In FIG. 6, the device remains in a fixed orientation while the adjustable cameras are rotated through a plurality of view direction. The devices 510 and 610 may be similar or identical to device 110, static cameras 516 and 616 may be similar or identical to camera 116, and adjustable cameras 518A, 518B, 618A, and 618B may be similar or identical to adjustable cameras 118A, 118B, 302A, 302B, 402A, and 402B.

As shown in FIG. 5, to capture a panoramic image, the device 510 receives an input or indication requesting for a panoramic image to be captured. The device 510 then moves the adjustable view directions of the adjustable cameras 518A,518B away from the static view direction of the static camera 516. As a result, the combined FOV of cameras 516, 518A, and 518B is widened. The movement of the adjustable view directions is accomplished by the device 510 causing the respective MEMS mirrors of each adjustable camera to rotate or change orientation.

The three cameras 518A, 516, and 518B then capture respective images 530A, 530B, and 530C. The user may then move or change the orientation of the device 510 to a second orientation, while the MEMS mirrors of the adjustable cameras 518A and 518B remain in fixed positions. In this second device orientation, the three cameras 518A, 516, and 518B then capture respective images 530D, 530E, and 530F. The user may then move or change the orientation of the device 510 to a third orientation, while the MEMS mirrors of the adjustable cameras 518A and 518B remain in fixed positions. In this third device orientation, the three cameras 518A, 516, and 518B then capture respective images 530G, 530H, and 530I.

After the cameras capture images 530A-I, the device 510 and/or image capture application may stitch the images together to generate panoramic image 540, which may be displayed on a screen of the device 510.

In some examples, there may be more or fewer cameras. For instance, the process shown in FIG. 5 may be performed by a device using any number of static cameras and any number of adjustable cameras. In addition, the process shown in FIG. 5 is illustrated with the device 510 being oriented in three different orientations. It should be appreciated that in other examples the device 510 may be oriented in 2, 4, or more different orientations when the images are captured prior to being stitched together to generate the panoramic image. Furthermore, the process shown in FIG. 5 is illustrated with movement of the device 510 from up to down. It should be appreciated that in other examples, the device 510 may be moved down to up, left to right, right to left, or in any other direction while images are being captured by the respective cameras. Furthermore, it should be appreciated that while FIG. 5 illustrates the adjustable camera view directions being directed horizontally away from the static camera view direction, in other examples the adjustable view directions may be directed up, down, left, right, and/or at any other angle relative to the device 510. In one example, for instance, the first adjustable camera 518A may be directed upward, while the second adjustable camera 518B is directed downward. The user may then pan the device orientation from left to right, and the cameras may capture images as the device moves from left to right. The images from each camera may then be stitched together to create a panoramic image in a similar manner to that illustrated in FIG. 5.

In FIG. 6, a second example technique for taking a panoramic image is illustrated. In this example, the device 610 is held in a fixed orientation while the adjustable cameras 618A and 618B are moved through a series of different view directions. To capture a panoramic image, the device 610 receives an input or indication requesting for a panoramic image to be captured. The device 610 then moves the adjustable view directions of the adjustable cameras 618A,618B to respective first directions. As shown in FIG. 6, these respective first directions are angled away from each other, such that the combined FoV of cameras 618A and 618B is greater than the individual FoV of each camera. The movement of the adjustable cameras is accomplished by the device 610 causing the respective MEMS mirrors of each adjustable camera to rotate or change orientation.

The adjustable cameras 618A and 618B then capture respective images 630M and 630N. Then without the user changing the orientation of the device 610, the MEMS mirrors of the adjustable cameras 618A and 618B are moved such that the view directions of the cameras 618A and 618B are in a second direction. In this second direction, the adjustable cameras 618A and 618B then capture respective images 630O and 630P. Without the user changing the orientation of the device 610, the MEMS mirrors of the adjustable cameras 618A and 618B are moved such that the view directions of the cameras 618A and 618B are in a third direction. In this third direction, the adjustable cameras 618A and 618B then capture respective images 630Q and 630R. After the cameras capture images 630M-R, the device 610 and/or image capture application may stitch the images together to generate panoramic image 640, which may be displayed on a screen of the device 610.

In some examples, there may be more or fewer cameras. For instance, the process shown in FIG. 6 may be performed by a device using any number of static cameras and any number of adjustable cameras. In addition, the process shown in FIG. 6 is illustrated without the use of the static camera 616. However, it should be appreciated that in other examples the static camera 616 may be used as well, and any image(s) captured by the static camera 616 may be stitched together with the images captured by the adjustable camera(s) to generate the resulting panoramic image. Furthermore, the process shown in FIG. 6 is illustrated with movement of the adjustable camera view directions from up to down. It should be appreciated that in other examples, the view directions of the adjustable cameras may be moved down to up, left to right, right to left, or in any other direction while images are being captured by the respective cameras. Furthermore, it should be appreciated that while FIG. 6 illustrates the adjustable camera view directions being directed horizontally away from the static camera view direction, in other examples the adjustable view directions may be directed up, down, left, right, and/or at any other angle relative to the device 610. Additionally, while the example of FIG. 6 illustrates symmetric movement of the adjustable camera view directions, in some examples the view directions may be moved asymmetrically.

In some examples, the speed of movement of the MEMS mirror is fast enough that it allows for capturing of images at different mirror positions (and thus different camera view directions) in quick succession. Consequently, by repeatedly scanning the MEMS mirrors from left to right, even though both cameras capture multiple images rather than a continuous video, these images can be stitched together to create a panoramic video with a wide horizontal and/or vertical field of view. However, the panoramic video may have a relatively lower frame rate than the original capability of the camera. For example, if each camera captures four images from left to right and they are stitched together to generate a panoramic video frame, the device may obtain a 30 fps video if the original capture rate is 120 fps.

In some examples, a device may include a stationary camera and one or more adjustable cameras. When a user attempts to take a picture using the static or primary camera, the device may identify an object of interest in the FoV of the static camera. In response to detecting the object of interest in the scene captured by the static camera, the device may move the adjustable view direction of the one or more adjustable cameras such that the FoV of the adjustable camera includes more of the object of interest than the FoV of the static camera. That is, when the device determines that the object of interest is not fully included in the static camera FoV, the device may automatically move the adjustable camera FoV to capture a portion of the object of interest that is outside the FoV of the static camera.

The device may determine whether there is an object of interest in the static camera FoV by performing image processing and/or scene analysis on one or more previously captured frames. Objects of interest may include people, animals, landmarks, bridges, buildings, etc. Taking a bridge, for example, when a user attempts to take a picture of a bridge in the background of a scene, but fails to include the entire bridge in the static camera FoV (instead opting to capture people or other objects in the foreground with the static camera FoV), the device may determine that the resulting image will cut off a portion of the bridge. Upon determining that the object of interest is at least partially out of the FoV of the static camera, the device may automatically identify the position of the object of interest with respect to the current FoV of the static camera. The device may then move the view direction of the adjustable camera to enlarge the overall device FoV to capture more of the object of interest. The device may then capture images using both the static camera and the adjustable camera, and stitch the images together to generate an image that includes a greater amount of the object of interest or even the whole object of interest.

In some examples, the static camera may have a first FoV. When capturing an image or video, the adjustable camera may scan around the static first FoV to enlarge it on all sides. The resulting image generated from the static camera and the images captured by the adjustable camera as it scans may be combined to generate an image that has a larger FoV on all four sides of the first FOV of the static camera.

In further examples, all of the features disclosed herein may apply to capturing video as well as images. Some portions of a captured video may have a higher resolution than others (e.g., the static camera FoV may have a higher resolution than the FoV captured by the adjustable camera(s) since the adjustable camera viewing direction may not be constant while it is scanning).

In some examples, the adjustable view direction of the adjustable camera(s) may be manually controlled by a user interface. For example, the user may control the adjustable camera view direction via interaction with the user interface, rather than having the adjustable camera view direction automatically controlled by the device. This may offer an additional level of customization to the user.

In some examples, the device may identify viewing directions that result in failed stitching. In response, the device may automatically move the MEMS mirrors of the adjustable camera(s) to point to locations that the panorama stitching fails and obtain better stitching results. The device may use stitching progress, difficulty, and/or other relevant metrics as a trigger to move the viewing direction of the adjustable cameras to fix or correct issues with the stitching.

Figure 7:
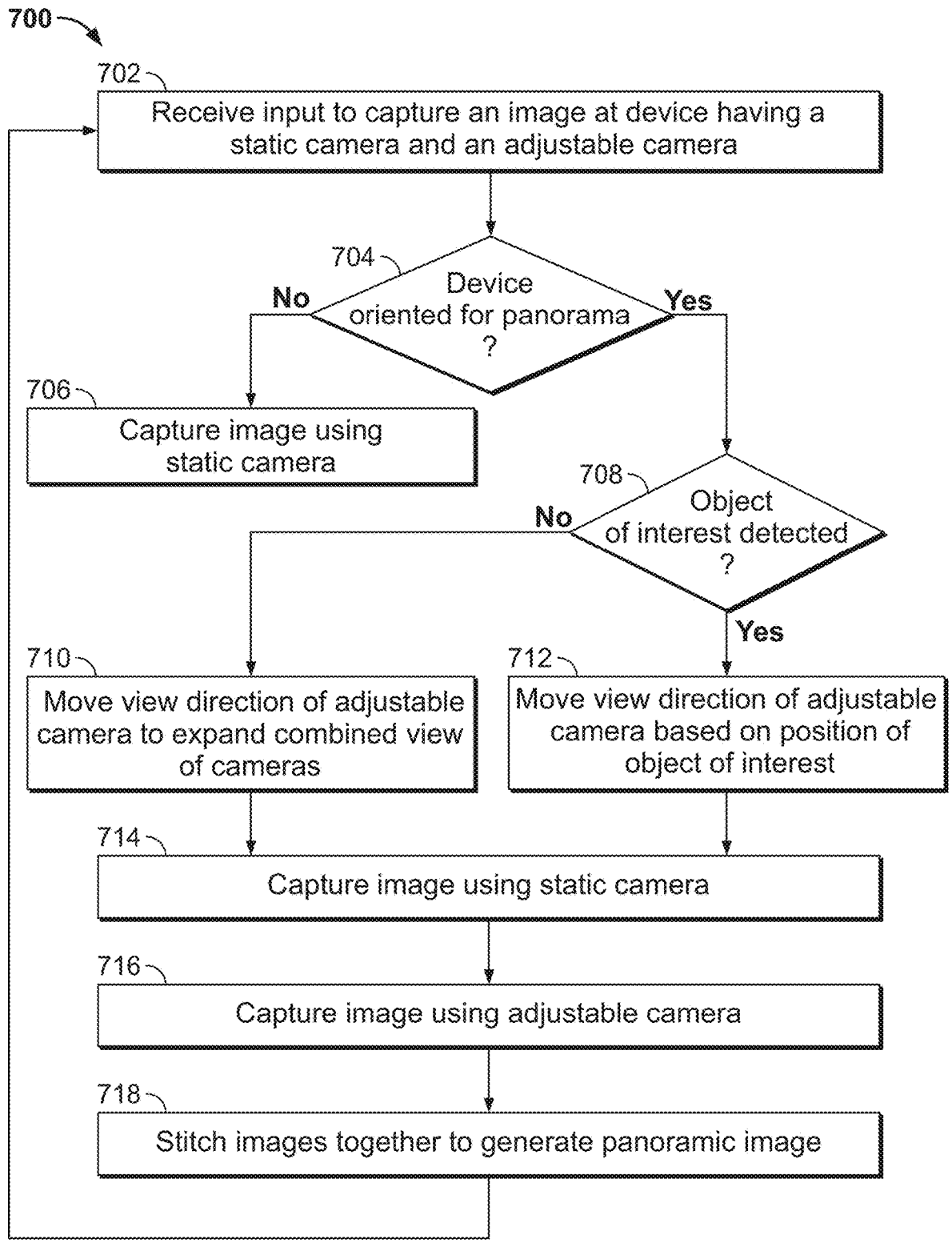
FIG. 7 is a flowchart of an illustrative process for taking a panoramic image using a device having a static camera and an adjustable camera, in accordance with some embodiments of this disclosure.

FIG. 7 illustrates a flowchart of a detailed illustrative process 700 for capturing a panoramic image, in accordance with some embodiments of this disclosure. In various embodiments, the individual steps of process 700 may be implemented by one or more components of the devices, processes, and systems of FIGS. 1-6 and 8-17 and may be performed in combination with any of the other processes and aspects described herein. Although the present disclosure may describe certain steps of process 700 (and of other processes described herein) as being implemented by certain components of the computing devices, processes and systems of FIGS. 1-6 and 8-17, this is for purposes of illustration only. It should be understood that other components of the computing devices, processes, and systems of FIGS. 1-6 and 8-17 may implement those steps instead.

At 702, I/O circuitry (e.g., I/O circuitry 1602 of computing device 1600 of FIG. 16 and/or I/O circuitry 1712 of server 1704 of FIG. 17) may receive input to capture a video using a camera (e.g., camera 116, 118A, 118B of FIG. 1) of a computing device (e.g., computing device 110 of FIG. 1). Such a camera may comprise a camera direction control element (e.g., MEMS scanning mirror 122A, 122B of FIG. 1). Such input may be received in any suitable form, e.g., as voice input, tactile input, input received via a keyboard or remote, input received via a touchscreen, text-based input, biometric input, or any other suitable input, or any combination thereof. In some embodiments, the input received at 702 may correspond to receiving a selection of a video or imaging application provided by an operating system of (or an application installed on) the computing device and/or the camera interfacing with various components (e.g., image sensor 120A, 120B, lenses 122A, 122B, MEMS scanning mirror 124A, 124B, and/or any other suitable components).

At 704, control circuitry (e.g., control circuitry 1604 of computing device 1600 of FIG. 16 and/or control circuitry 1711 of server 1704 of FIG. 17) may determine whether the device is oriented to capture a panorama. This may include determining via inertial sensors coupled to the device or other sensors whether the device is oriented horizontally or vertically, and/or in a particular orientation conducive to capturing a panoramic image. If the device is not in an orientation conducive to taking a panorama, the control circuitry may control the device to operate in a normal mode by controlling the static camera to capture an image at step 706. That is, if the device is not oriented in an orientation conducive to taking a panoramic image, the device may simply control the static camera to capture an image without controlling the one or more adjustable cameras to move.

At 708, the control circuitry determines whether an object of interest is detected in a FoV of the static camera of the device. As noted above, the static camera and the one or more adjustable cameras may have their respective view directions aligned with each other in a default mode or as a default setting. Images captured by the main or static camera may be analyzed to determine whether there is an object of interest, or a portion of an object of interest, included in the FoV of the static camera. The object of interest may include one or more people, animals, landmarks, buildings, etc. In step 708, if a portion of an object of interest is identified, the control circuitry may also analyze the portion of the object of interest to identify whether the object of interest extends beyond the FoV of the static camera, and if so in what direction. This enables the control circuitry to determine which direction(s) the FoV of the combined cameras of the device should expand in order to capture more of the object of interest.

If no object of interest is detected in the initial FOV of the static camera, the process 700 continues to step 710. At 710, the view directions of the one or more adjustable cameras are moved to expand the combined FOV of all of the cameras of the device. As noted above with respect to FIGS. 1-6, this may include moving the view directions of a first adjustable camera and a second adjustable camera in opposite directions away from the view direction of the static camera. In other examples, the view directions of the adjustable cameras may move in the same direction, opposite directions, or in directions individually without regard for the direction of the other camera's movements.

However, if an object of interest is detected in the initial FOV of the static camera, the process 700 continues to step 712. At 712, the control circuitry causes the view direction of the one or more adjustable cameras to move based on the position of the identified object of interest. That is, if the object of interest is a building that extends beyond the top of the FoV of the static camera, the control circuitry may move the adjustable camera view direction to point upward, so as to include the top of the building and extend the combined device FoV upward. Alternatively, if the object of interest is a group of people that extends sideways beyond the left and/or right edges of the static camera FoV, the control circuitry may move a first adjustable camera view direction to the left and a second adjustable camera view direction to the left to expand the horizontal FoV of the combined cameras such that all of the group of people are included.

At 714 and 716, the control circuitry controls the static camera and the adjustable cameras to capture images of their respective FoVs. Then, at 718, the control circuitry stitches the images together to generate a panoramic image. As noted above, there may be overlap between the FoVs of the static camera and the adjustable cameras. This overlap may be used to identify common features and align the images to stitch them together. The process 700 then proceeds back to step 702 to receive another input to capture an image. The process 700 may then continue in a loop until the user turns off the device, exits out of the image capture application, or otherwise selects an option to end the process.

Figure 8:
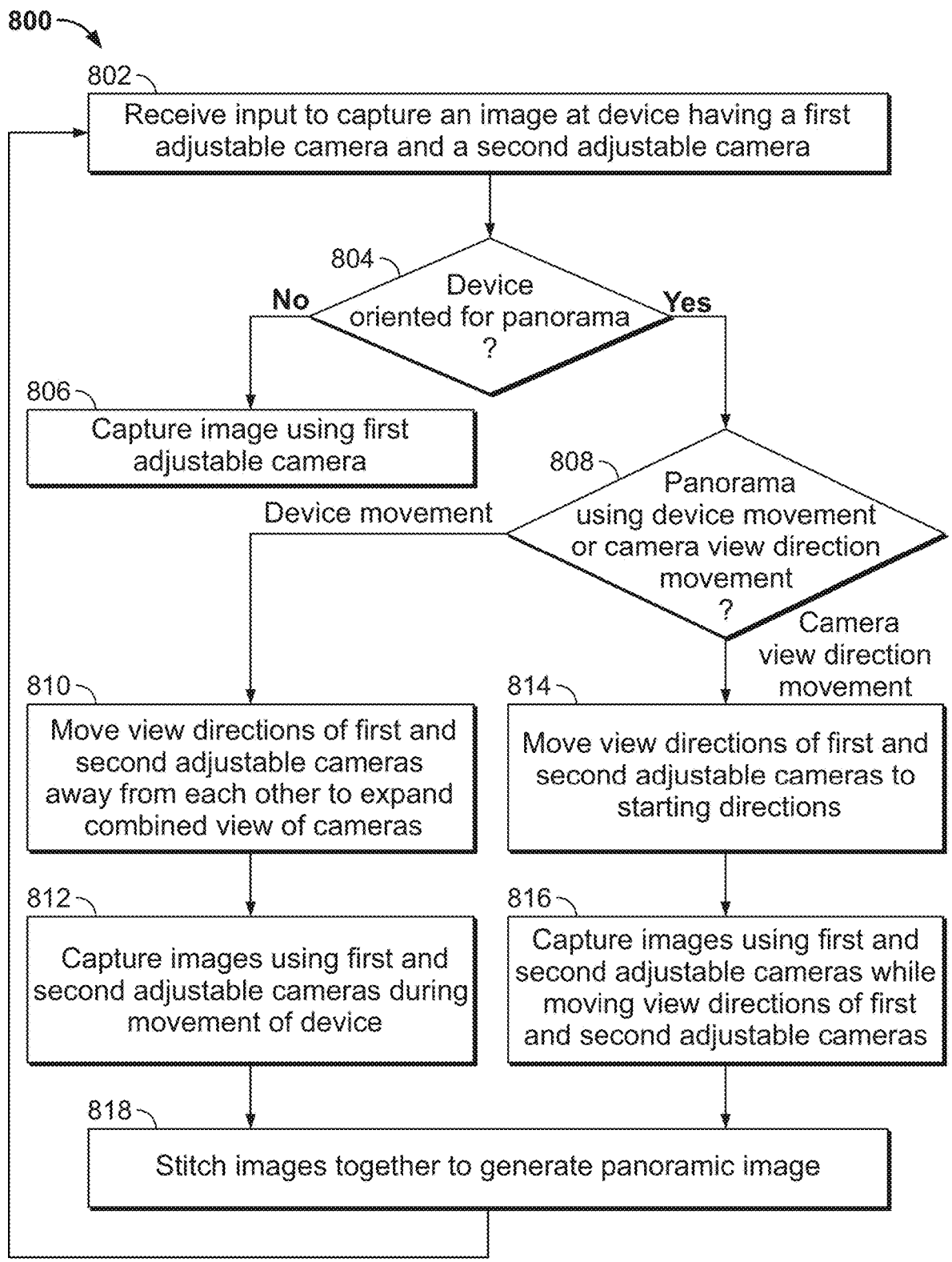
FIG. 8 is a flowchart of another illustrative process for taking a panoramic image using a device having first and second adjustable cameras, in accordance with some embodiments of this disclosure.

FIG. 8 illustrates a flowchart of a detailed illustrative process 800 for capturing a panoramic image using a device having first and second adjustable cameras, in accordance with some embodiments of this disclosure. In various embodiments, the individual steps of process 800 may be implemented by one or more components of the devices, processes, and systems of FIGS. 1-7 and 9-17 and may be performed in combination with any of the other processes and aspects described herein. Although the present disclosure may describe certain steps of process 800 (and of other processes described herein) as being implemented by certain components of the computing devices, processes and systems of FIGS. 1-7 and 9-17, this is for purposes of illustration only. It should be understood that other components of the computing devices, processes, and systems of FIGS. 1-7 and 9-17 may implement those steps instead.

At 802, I/O circuitry (e.g., I/O circuitry 1602 of computing device 1600 of FIG. 16 and/or I/O circuitry 1712 of server 1704 of FIG. 17) may receive input to capture a video using an adjustable camera (e.g., cameras 118A, 118B of FIG. 1) of a computing device (e.g., computing device 110 of FIG. 1). Such an adjustable camera may comprise a camera direction control element (e.g., MEMS scanning mirror 122A, 122B of FIG. 1). Such input may be received in any suitable form, e.g., as voice input, tactile input, input received via a keyboard or remote, input received via a touchscreen, text-based input, biometric input, or any other suitable input, or any combination thereof. In some embodiments, the input received at 802 may correspond to receiving a selection of a video or imaging application provided by an operating system of (or an application installed on) the computing device and/or the camera interfacing with various components (e.g., image sensor 120A, 120B, lenses 122A, 122B, MEMS scanning mirror 124A, 124B, and/or any other suitable components).

At 804, control circuitry (e.g., control circuitry 1604 of computing device 1600 of FIG. 16 and/or control circuitry 1711 of server 1704 of FIG. 17) may determine whether the device is oriented to capture a panorama. This may include determining via inertial sensors coupled to the device or other sensors whether the device is oriented horizontally or vertically, and/or in a particular orientation conducive to capturing a panoramic image. If the device is not in an orientation conducive to taking a panorama, the control circuitry may control the device to operate in a normal mode by controlling a first adjustable camera to capture an image at step 806. That is, if the device is not oriented in an orientation conducive to taking a panoramic image, the device may simply control the first adjustable camera to capture an image when in a default view direction, without controlling the one or more adjustable cameras to move to a different view direction.

At 808, the control circuitry determines whether the desired panoramic image should be captured using (1) device movement, or (2) movement of the adjustable camera view directions without movement of the device. The device may receive input from the user selecting one of these two types of panoramic image capture, and/or the control circuitry may make the determination based on sensor data (e.g., based on device orientation). In some examples, the control circuitry may determine whether the panoramic image should be captured using device movement or camera view direction movement without device movement based on image analysis, and/or a determination of the subject of the image. For instance, the control circuitry may analyze an initial image captured by one or more of the adjustable cameras to identify an object of interest. If the object of interest extends out of the FoV horizontally, the control circuitry may determine that the user intends to capture a horizontal panoramic image. If the object of interest extends out of the FoV vertically, the control circuitry may determine that the user intends to capture a vertical panoramic image. Then, the control circuitry may consider whether a horizontal panoramic image or a vertical panoramic image is desired, in addition to the orientation of the device itself, in determining whether the panoramic image should be captured using device movement or using camera view direction movement without device movement. In further examples, the control circuitry may make this determination based on a user setting, user input selecting panoramic image with device movement or without device movement, or other indication of how the user desires for the panoramic image to be captured. If the control circuitry determines that the panoramic image should be taken using device movement, the process 800 proceeds to step 810. If the control circuitry determines that the panoramic image should be taken using camera view direction movement without device movement, the process 800 proceeds to step 814.

At 810, the control circuitry moves the view directions of the first and second adjustable cameras away from each other to expand the combined FOV of the device. The adjustable camera view directions may then remain fixed relative to the device, as the user moves the device or rotates the orientation of the device during capture of the images from the adjustable cameras. At 812, the device captures images using the adjustable cameras as the user moves or rotates the device. The device may present a user interface indicating how the user should move the device (e.g., an arrow), so that the user can move the device appropriately to capture the desired images. This movement and image capturing may be similar or identical to what is shown and described with respect to FIG. 5.

At 814, the control circuitry moves the view directions of the first and second adjustable cameras to their respective first view directions. For example, this may include moving the view directions to the highest vertical direction (i.e., as shown in the top portion of FIG. 6.). Then at 816, the control circuitry causes the device to capture images using the first and second adjustable cameras. The control circuitry also causes the view directions of the first and second adjustable cameras to rotate (e.g., downward as shown in FIG. 6), while the device continues to capture images.

At 818, the control circuitry stitches the images captured by the adjustable cameras as their view directions move (either by movement of the device as in FIG. 5, or by movement of the view directions relative to the device as in FIG. 6). The device may then present the resulting panoramic image via a display to the user. The process 800 then proceeds back to step 802 to receive another input to capture an image. The process 800 may then continue in a loop until the user turns off the device, exits out of the image capture application, or otherwise selects an option to end the process.

FIGS. 9-15 relate to examples in which an adjustable camera (e.g., the adjustable cameras described above with respect to FIGS. 1-8) can be used to enhance visual tracking, particularly in environments having sparce visual features or positioning cues. The MEMS mirror of the adjustable camera may enable the camera to scan the surrounding environment when the primary camera is facing an area with insufficient feature points for positioning a virtual object. This scanning process may identify regions with trackable visual features outside the primary camera's FoV. The captured images of these additional regions of the environment may then be integrated into the tracking algorithm, thereby supplementing the tracking data from the primary camera and improving tracking performance. This process may operate seamlessly in the background (i.e., without the need for user input), thereby improving the user experience by enhancing tracking accuracy and stability in AR applications and similar technologies that rely on visual odometry.

Figure 9:
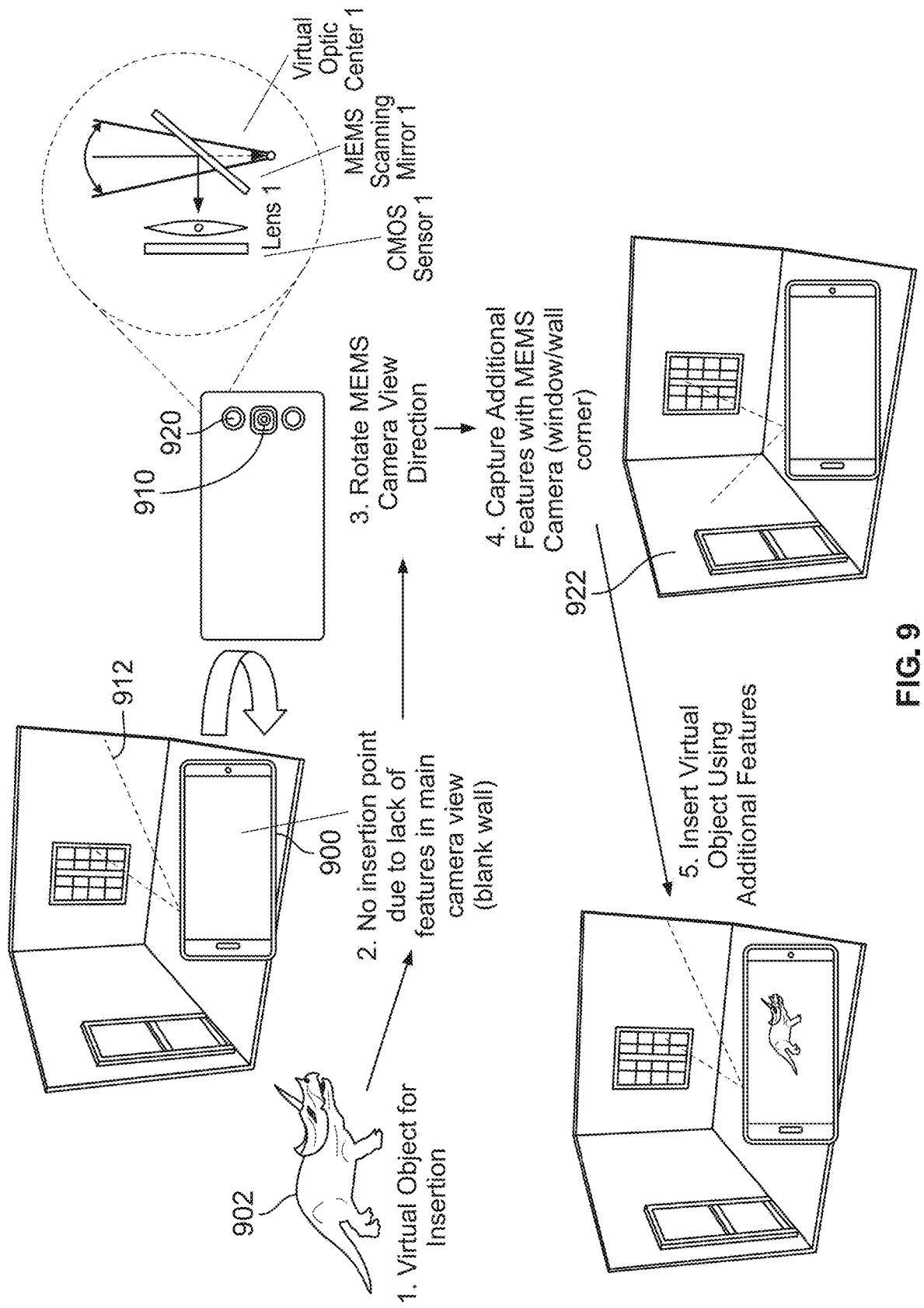
FIG. 9 depicts an illustrative block diagram and process for positioning a virtual object on a screen of a device including at least one adjustable camera, in accordance with some embodiments of this disclosure.

FIG. 9 depicts an example scenario in which a device 900 attempts to display a virtual object 902 in a position on the display of the device 900 based on tracking data from the environment. In this scenario, the device uses AR to anchor the virtual object 902 onto the real world through the camera of the device 900 to create an immersive user experience that blends the digital and physical realms.

As shown in FIG. 9, the device 900 may comprise or correspond to a head-mounted computing device; mobile device such as, for example, smartphone or tablet; a camera; a camera array; a laptop computer; a personal computer; a desktop computer; a smart television; a smart watch or wearable device; smart glasses; a stereoscopic display; a wearable camera; extended reality (XR) glasses; XR goggles; an XR head-mounted display (HMD); near-eye display device; any other suitable computing device; or any combination thereof. The device 900 may be configured to operate using XR techniques. XR may be understood as virtual reality (VR), augmented reality (AR) or mixed reality (MR) technologies, or any suitable combination thereof. VR systems may display images to generate a three-dimensional environment to fully immerse (e.g., giving the user a sense of being in an environment) or partially immerse (e.g., giving the user the sense of looking at an environment) users in a three-dimensional, computer-generated environment. Such an environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects. In some embodiments, the environment may be a real-world environment, an AR environment (e.g., a real-world environment depicted as having virtual object overlaid thereon), or a VR environment.

Device 900 may be similar or identical to devices 110, 510, and/or 610 described above with respect to FIGS. 1-8. Device 900 may comprise, be attached to, be incorporated in, and/or other-wise be in communication with a static camera 910, and/or one or more adjustable cameras 920. Cameras 910 and 920 may comprise one or more image sensors, e.g., a charge-coupled device (CCD); a complementary metal-oxide semiconductor (CMOS); or any other suitable sensor (e.g., optical sensors); or any suitable combination thereof. In some embodiments, camera 920 may comprise a camera direction control element (e.g., including microelectromechanical systems (MEMS) scanning mirror) for controlling a capturing direction of the camera. Cameras 910 and/or 920 may be outward facing cameras configured to capture images and/or video of an environment proximate to device 900. In some embodiments, one or more of cameras 910 and/or 920 may correspond to a pan, tilt, and zoom (PTZ) camera, and/or may be mounted in a robot or unmanned aerial vehicle (UAV).

In some embodiments, an image capture application may be executed at least in part on device 900 and/or cameras 910 and 920 and/or at one or more remote servers and/or at or distributed across any of one or more other suitable computing devices, in communication over any suitable number and/or types of networks (e.g., the Internet). The image capture application may be similar or identical in one or more respects to the image capture application described above with respect to FIGS. 1-8. The image capture application may be configured to perform the functionalities (or any suitable portion of the functionalities) described herein. In some embodiments, the image capture application may be a stand-alone application, or may be incorporated as part of any suitable application, e.g., XR applications, video or image or electronic communication applications, social networking applications, image or video capturing and/or editing applications, image analysis applications, or any other suitable application(s), or any combination thereof.

In some embodiments, the image capture application may be understood as middleware or application software or any combination thereof. In some embodiments, the image capture application may be considered as part of an operating system (OS) of device 900 and/or as part of an OS of cameras 910 and/or 920, or separate from the OS of device 900 and cameras 910 and/or 920. The OS may be operable to initialize and control various software and/or hardware components of device 900. The image capture application may correspond to or be included as part of an image capture system, which may be configured to perform the functionalities described herein.

In some embodiments, the image capture application may be installed at or otherwise provided to a particular computing device, may be provided via an application programming interface (API), or may be provided as an add-on application to another platform or application. In some embodiments, software tools (e.g., one or more software development kits, or SDKs) may be provided to any suitable party, to enable the party to implement the functionalities described herein.

Referring back to FIG. 9, at step 1 the device 900 receives an input or instruction to position or place virtual object 902 on the display of device 900. The input may be received in any suitable form, e.g., as voice input, tactile input, input received via a keyboard or remote, input received via a touchscreen, text-based input, biometric input, or any other suitable input, or any combination thereof. Device 900 is shown including a primary camera or static camera 910, as well as an adjustable camera 920. The static camera 910 has a corresponding FoV 912 which includes a blank wall of the environment as shown in FIG. 9.

The device 900 may be configured to employ any suitable computer-implemented technique to identify and track visual features, positioning cues, or other features in the environment that may be used for purposes of tracking movement and/or positioning virtual objects. For example, the device 900 and/or associated image capture application may employ machine learning and/or heuristic techniques in real time to identify and track visual features identified in the FoV of camera 910 and/or 920. In the context of this application, the terms visual features and positioning cues may be used interchangeably to refer to identifiable points in images captured by the cameras that may be used by one or more algorithms and/or processing techniques to accomplish the functions described herein. The device 900 and/or image capture application may perform image segmentation (e.g., semantic segmentation and/or instance segmentation) to identify, localize, distinguish, and/or extract different objects, visual features, positioning cues, and/or different types or classes of the objects, visual features, positioning cues, or portions thereof, in the images captured by cameras 910 and/or 920. For example, such segmentation techniques may include determining which pixels in the image captured by camera 910 belong to edges of a window in the environment.

Visual tracking may be understood as a computer vision technology with many applications, from augmented reality (AR) to autonomous driving. Visual tracking may include detecting and monitoring specific features or positioning cues in an environment over a sequence of image frames. These features or cues can be distinctive patterns, edges, colors, or other identifiable elements within the scene. Augmented Reality (AR) may include anchoring virtual elements onto the real world as viewed through the device's camera, creating an immersive user experience that seamlessly blends digital and physical realms. Accurately understanding the AR camera's movement in the real world is essential to accurately anchoring virtual objects to real-world locations. To achieve this, AR techniques may rely on a device's cameras to track the user's environment. Modern smartphones may offer at least two rear-mounted cameras in addition to a front-facing camera. Each camera serves a specific purpose, such as capturing standard shots, wide-angle images, or zoom-ins. Rear cameras are typically aligned in the same direction, which limits the effective field of view.

Referring back to FIG. 9, upon receiving an input to position the virtual object 902 on the display of device 900, the device 900 attempts to identify visual features within the static camera 910's field of view of the environment. The camera 910 capture one or more images, and the device 900 performs image analysis to identify visual features suitable for use in anchoring the virtual object 902. If there are not sufficient visual features in the image(s) captured by the static camera 910, the device 900 determines that there is no insertion point for the virtual object 902 due to a lack of visual features in the main camera view. As illustrated in FIG. 9, this may occur when the main camera FoV 912 includes a blank wall or single wall that does not provide any patterns, edges, etc. with identifiable elements.

In response, the device 900 may attempt to augment the main camera FOV with additional images covering a wider FoV, in order to identify sufficient visual features or positioning cues that can be used for tracking and virtual object placement. To accomplish this, the device 900 may rotate the adjustable camera 920 (i.e., by reorienting the corresponding MEMS mirror) such that the adjustable camera 920 FoV 922 captures a different portion of the environment than the primary camera 910 FoV 912. As illustrated in FIG. 9, the adjustable camera 920 is moved such that its corresponding FoV 922 includes a window and a corner of the room in the environment. In this example, the view direction of the adjustable camera 922 is moved horizontally. However, it should be understood that the direction of movement (and/or movement pattern) of the adjustable camera can be random, may be based on stored angles, may be based on a ranked list of angles, may be based on a scanning algorithm, may be based on other device and/or sensor data, and more. Various examples are discussed in further detail below.

After moving the view direction of the adjustable camera 920 such that the corresponding FoV 922 is different from the FoV of the main camera 910, the adjustable camera 920 then captures one or more additional images. The device 900 performs analysis on the one or more additional images to identify additional visual features or positioning cues for tracking and virtual object placement. In some examples, discussed in further detail below, the angle at which the one or more additional images are captured by the adjustable camera is stored, along with the number and/or quality of visual features present in the one or more additional images.

Once the one or more additional images are captured and analyzed to identify the visual features or positioning cues, the device 900 then combines the visual feature information from both the main camera 910 and the adjustable camera 920. The device then uses this combined visual feature information to position the virtual object 902, wherein the positioning of the virtual object 902 is based at least in part on the visual features or positioning cues identified in the one or more additional images captured by the adjustable camera 920.

Figure 10:
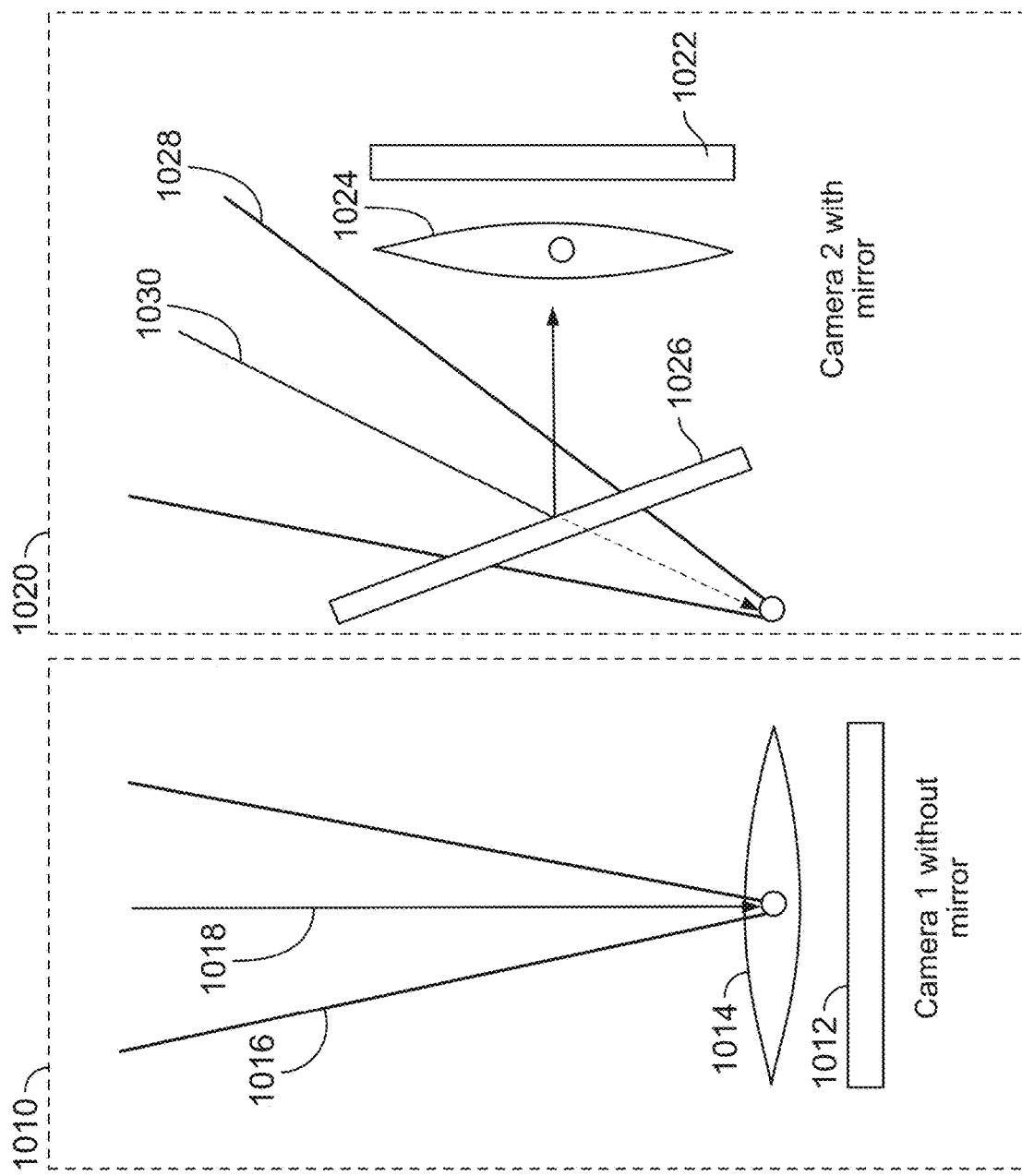
FIG. 10 depicts an illustrative block diagram of a static camera and an adjustable camera of a device, in accordance with some embodiments of this disclosure.

FIG. 10 illustrates an example two-camera system for a device, including a static camera 1010 and an adjustable camera 1020. Camera 1010 may be similar or identical to cameras 116, 430, 516, 616, and 910, and camera 1020 may be similar or identical to cameras 118A, 118B, 302A, 302B, 402A, 402B, 518A, 518B, 618A, 618B, and 920. Camera 1010 may be the primary rear-facing camera of the device, and may include an image sensor 1012, a lens 1014, have a FoV 1016, and have a view direction 1018. Camera 1020 may be an adjustable periscope camera equipped with an image sensor 1022, a lens 1024, a MEMS scanning mirror 1026, have a FoV 1028, and have an adjustable view direction 1030. The MEMS mirror 1026 positioned in front of the lens 1024 may function to redirect the optical center of the camera 1020. In AR applications, the regular rear-facing camera 1010 may serve as the primary camera with two functionalities. A first functionality is to capture the real scene if the see through is non-optical, and the second functionality is to track the ego-motion of the device in real-time so that virtual objects positioned in the real scene will remain stable.

Because each adjustable camera (i.e., camera 1020) will have a different optical center and FoV, in one embodiment, a comprehensive calibration process is carried out for each of these adjustable cameras before deployment. This process determines their external parameters, which includes their relationship to the primary camera (i.e., camera 1010) that is tasked with capturing the scene for display. During the calibration process, the transformation between the 3D world frames of the two cameras may be established. Each predefined mirror position of the MEMS scanning mirror (i.e., MEMS mirror 1026) corresponds to a unique 3D world frame for the adjustable camera 1020, distinct from the world frame of the primary camera 1010. By calibrating for these positions, the device may obtain the transformations that map the 3D points in the adjustable camera's frame to the primary camera's frame. This may enable accurate comparisons, tracking, stitching, and other image processing functions to be carried out with respect to images from each of the cameras.

Figure 11:
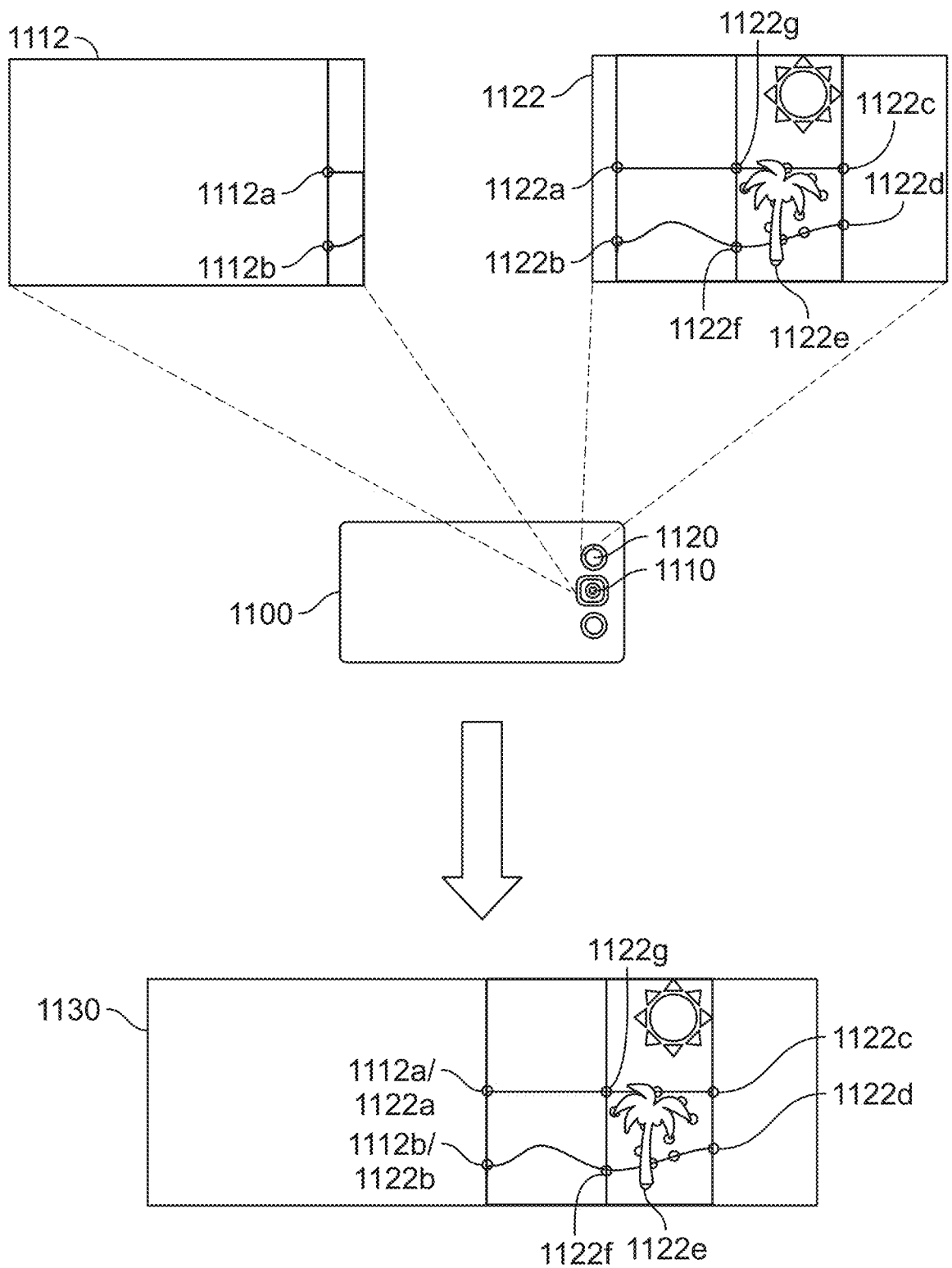
FIG. 11 depicts a block diagram illustrating how images from a static camera and an adjustable camera can be combined to identify positional cues for positioning a virtual object, in accordance with some embodiments of this disclosure.

FIG. 11 illustrates an example scenario in which images from both a static camera 1110 and an adjustable camera 1120 are analyzed, and the positioning cues from both images are determined and combined to enable accurate tracking and positioning of a virtual object. The device 1100, static camera 1110, and adjustable camera 1120 may be similar or identical respectively to devices 110, 510, 610, 900, 1000, static cameras 116, 430, 516, 616, 910, and 1010, and adjustable cameras 118A, 118B, 302A, 302B, 402A, 402B, 518A, 518B, 618A, 618B, 920, and 1020.

As shown in FIG. 11, the device 1100 may receive an input or instruction to position a virtual object, and may begin a process to identify visual features or positioning cues that can be used to position the virtual object. The static camera 1110 FoV includes a blank wall and the edge of a window, as shown by the image 1112 captured by camera 1110. The device uses image processing and analysis to identify positioning cues 1112a and 1112b in the image 1112 captured by camera 1110. The device then determines that there are insufficient positioning cues for the tracking algorithm to use in positioning the virtual object.

The device 1110 causes the view direction of the adjustable camera 1120 to move to an area different from the FoV of the static camera 1110. As shown in FIG. 11, the adjustable camera 1120 view direction is moved to capture a FoV adjacent to the FoV of the static camera 1110. The adjustable camera then captures image 1122. After capturing image 1122, the device 1100 performs image processing and analysis to identify positioning cues 1122a-1122g.

The device 1110 then combines the positioning cues identified from the images captured by both cameras 1110 and 1120. This combination is represented by composite image 1130. As can be seen, there is partial overlap in the images 1112 and 1122: positioning cues 1112a and 1112b identified from image 1112 correspond to positioning cues 1122a and 1122b identified from image 1122. The device 1100 may then position the virtual object based on the combined positioning cues from both cameras 1110 and 1120.

As shown in FIG. 11, in some examples the first image 1112 and the second image 1122 may overlap in part. As such, the two images may share one or more positioning cues (e.g., positioning cues 1112a/1122a and 1112b/1122b). It should be appreciated that while in some examples there may be overlap between the two images, other examples may include no overlap. That is, the positioning cues identified from each image may be entirely distinct from each other. Furthermore, the positioning cues shown in FIG. 11 are for illustrative purposes only. It should be appreciated that in practice, there may be tens, hundreds, thousands, or more positioning cues in each image, and the positioning cues may be spread out, clustered, or distributed in various other ways within each image.

Additionally, FIG. 11 is illustrated showing a single image from each camera 1110 and 1120. However it should be appreciated that in practice, the tracking algorithm, image processing, and/or other functionalities of the device may include capturing multiple images over time, and determining how the positioning cue locations in the images change over time to track the movement of the device with respect to the environment.

Figure 12:
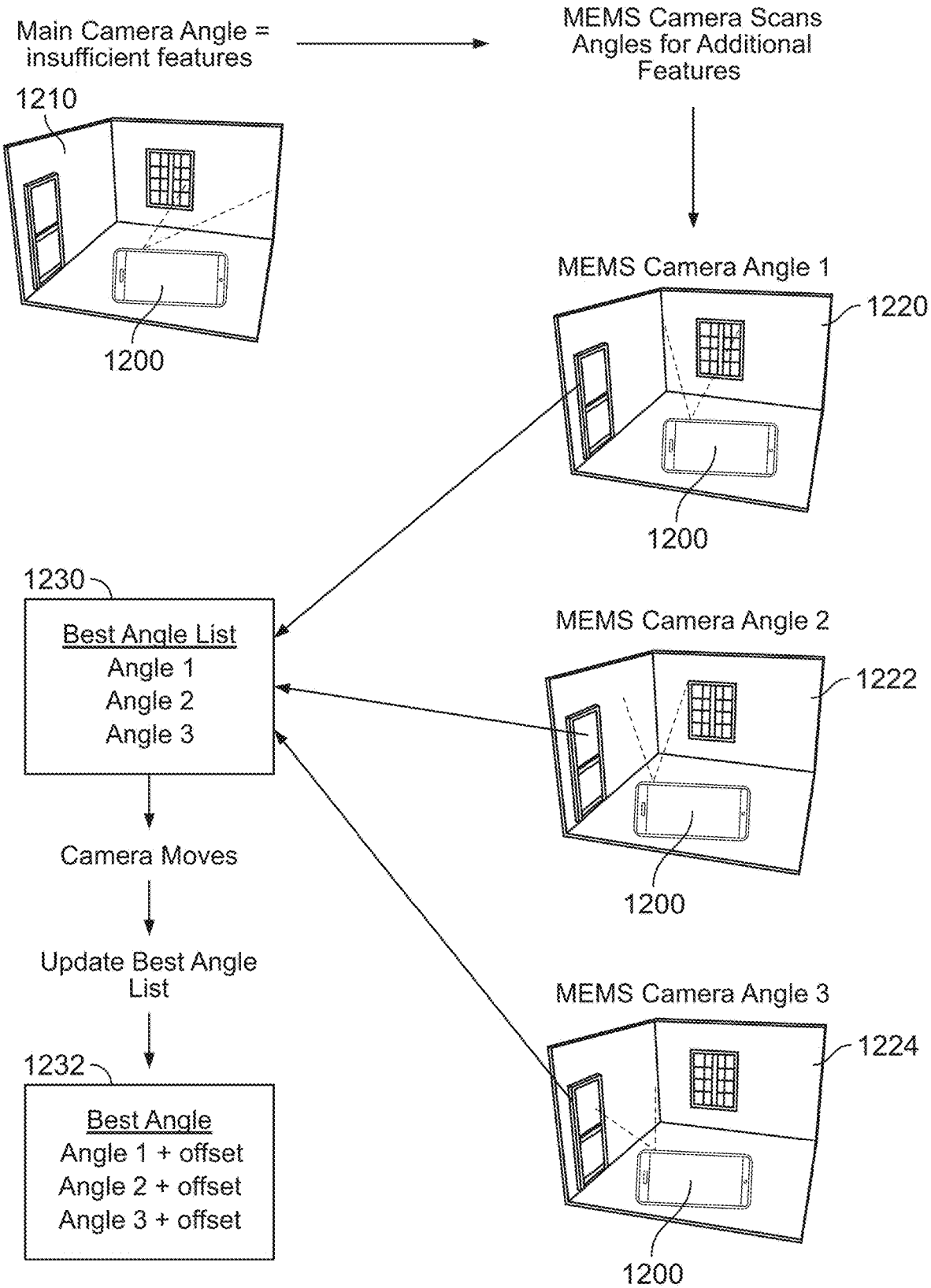
FIG. 12 depicts an illustrative block diagram and process for determining a list of best adjustable camera view direction angles for positioning a virtual object, in accordance with some embodiments of this disclosure.

FIG. 12 illustrates how the adjustable camera view direction may be moved to capture additional images of the environment, and how the viewing angle of the adjustable camera in each of these additional view directions may be stored, according to some embodiments. When additional images are captured by the adjustable camera, the viewing direction or angle of the camera for each additional image may be stored along with a metric relating to the corresponding positioning cues of the image. The angles can then be ranked according to how good they each are for purposes of capturing positioning cues.

In some examples, the device may determine a best angle at which to direct the adjustable camera in order to capture the largest number and/or best quality of positioning cues. That is, the adjustable camera may scan through multiple angles and images may be captured at each angle. The images may be processed to determine the visible positioning cues in each image, and the corresponding angles may be ranked on a list. FIG. 12 illustrate an example of how this process of identifying and storing the best adjustable camera angles may occur.

At 1210, the primary camera captures an image of its corresponding FOV of the environment. As illustrated in FIG. 12, the FoV of the primary camera in 1210 is a blank wall next to the window. Based on this FoV, the device 1200 is unable to identify sufficient positioning cues for purposes of tracking and/or positioning a virtual object.

The adjustable camera of device 1200 then scans and captures images at various angles by moving the corresponding MEMS mirror of the adjustable camera. These additional images and FoVs of the adjustable camera are shown, for example, at 1220, 1222, and 1224. Each of these additional images is then analyzed to identify the positioning cues that are present. The device 1200 then stores a list 1230 ranking each of the adjustable camera angles according to how well the respective angle is for purposes of tracking and/or positioning virtual object. For example, the angles may be ranked based on the number of positioning cues present in the image taken at that angle, the quality of positioning cues, and/or any other suitable metric for distinguishing between good and bad images or camera angles for purposes of tracking and/or virtual object positioning.

In some examples, this scanning may be performed continuously as the device operates, and the list of angles may be updated as new images are captured and analyzed. In other examples, this scanning process may be performed once, or at a regular or irregular interval. In some examples, the scanning process may be performed based on a threshold change in the number of positioning cues present in images captured by the primary camera and/or adjustable camera, based on a threshold change in the FoV of the primary camera, based on a threshold change in lighting in the environment (e.g., as detected by a light sensor of the device), based on a threshold change in the position or orientation of the device, based on a user input, and/or based on some other change in the environment, sensor data, or input.

In some examples, the device may control the adjustable camera to scan according to various patterns. For instance, in one example the scanning pattern may follow a random order. In other cases, the scanning may follow a pattern with respect to the device and/or FoV of the static camera (e.g., clockwise or counter-clockwise scanning of the adjustable camera FoV around the static camera FoV). In some examples, device may determine where to direct the adjustable camera during this scanning process based on the processing of images captured by the static camera and/or adjustable camera. For instance, the device may identify an area of environment with a high number of positioning cues, and may responsively control the adjustable camera view direction to focus on this identified area of the environment when scanning by making small changes to the adjustable camera view direction with respect to the identified area. In some examples the scanning may follow a pattern that scans the full extent of possible adjustable camera angles first to get a high-level overview of the environment visible by the adjustable camera, and may then focus on areas identified from that initial scan as having a high number of positioning cues for follow up or further analysis (e.g., similar to a breadth-first searching algorithm). Various other scanning patterns or criteria may be used to direct the scanning of the adjustable camera instead of or in addition to the criteria noted above.

In some examples, a user may change the positioning and/or orientation of the device 1200. In response to this movement, the device 1200 may determine and updated list of angles 1232 based the determined movement. The device may determine the movement using one or more inertial sensors, using dead reckoning, using GPS, and/or by using another sensor, device, or system. Then, when the device 1200 is again performing the process of positioning the virtual object (or positioning a new virtual object), the device 1200 may access the stored list of angles (and/or the list of updated angles) to direct the adjustable camera in a direction that has previously been identified as having a high number of positioning cues.

In one example, the features noted above may be understood in the context of a user moving the device from a first location to a second location within the environment, after a list of angles including a best angle has been identified and stored. The device may determine a difference between the first location and the second location (e.g., using dead reckoning based on one of inertial sensors or GPS). In response to the device receiving a second indication to place a second AR object on the screen of the device located in the second location, the device may identify a new best angle based on the stored best angle and the different between the first location and the second location (i.e., determine an angle for the adjustable camera when in the second position that captures a similar FoV of the best angle when the device was in the first position). The device may then move the adjustable view direction of the at least one adjustable camera to the new best angle. The device may then capture an image using the at least one adjustable camera pointed in a direction based on the new best angle, and generate for display the second AR object in a second position on the screen of the device determined at least in part based on positioning cues from the image taken using the new best angle.

As an example, after positioning a first virtual object on the screen as noted above with respect to FIG. 9, the user may move the device and/or put it in his or her pocket. If at a later time the user wishes to place another virtual object, the device may make use of the stored angle of the adjustable camera used to place the first virtual object. Upon determining that the static camera image does not have sufficient positioning cues when attempting to position the second virtual object, the device may move the adjustable camera to the stored direction (which may be offset based on movement of the device), and capture an additional image. This additional image can then be used to place the second virtual object. In effect, the stored angle provides a short cut in positioning the second virtual object because the device has already determined that the stored angle provides a sufficient number and quality of positioning cues.

In some examples, the device may use a known best angle for positioning of a virtual object, and may simultaneously or contemporaneously continue to scan for optimal camera angles. For instance, the adjustable camera may capture images at 30 FPS. A first frame may be taken at an angle known to provide sufficient positioning cues, while the other frames may be used to capture images at different angles, in order to search for a better camera angle. This process may be repeated once per second (or at some other interval), to allow the device to maintain positioning of the virtual object while also attempting to find a better camera angle. Because the MEMS mirror of the adjustable camera can move quickly, this allows the adjustable camera to scan many different angles during the time period when images from the adjustable camera are not needed for virtual object positioning. The device may only require a small fraction of the images captured by the adjustable camera (e.g., N frames per second, wherein N is less than the total number of frames captured by the adjustable camera per second). The device may take advantage of the adjustable camera's effective down time to scan for better or alternative positioning angles for the adjustable camera that may improve performance.

In one example, the device may be configured to move the adjustable view direction of the adjustable camera by rotating the adjustable view direction of the at least one adjustable camera between a first direction and a plurality of additional view directions. The device may then capture images using the at least one adjustable camera in each of the first direction and the plurality of additional view directions. Then, in response to the device determining that a second direction of the plurality of additional view directions provides a greater number of positioning cues than the first direction, the device may move the adjustable camera to the second direction and capture the second image. The determined second direction may then be the default direction of the adjustable camera used to position the virtual object, while the adjustable camera continues to scan further additional angles. That is, the best angle for use by the adjustable camera may continually be updated based on additional images captured and analyzed by the device.

The examples disclosed above generally presuppose that the static camera FoV does not contain sufficient positioning cues to track and/or positioning a virtual object. However, in some examples, the static camera FoV may contain sufficient positioning cues. In this example, the adjustable camera may still scan various different view direction angles and may be used to determine the list of best angles. In the event the positioning cues from the static camera FOV are no longer sufficient (e.g., if the static camera FoV changes, if the lighting changes, etc.), the predetermined list of adjustable camera angles may be up-to-date and ready to supplement the images from the static camera. That is, the adjustable camera may scan for the best angles even when it is not needed, as a preparation for a situation where the static camera is no longer able to provide sufficient positioning cues.

Figure 13:
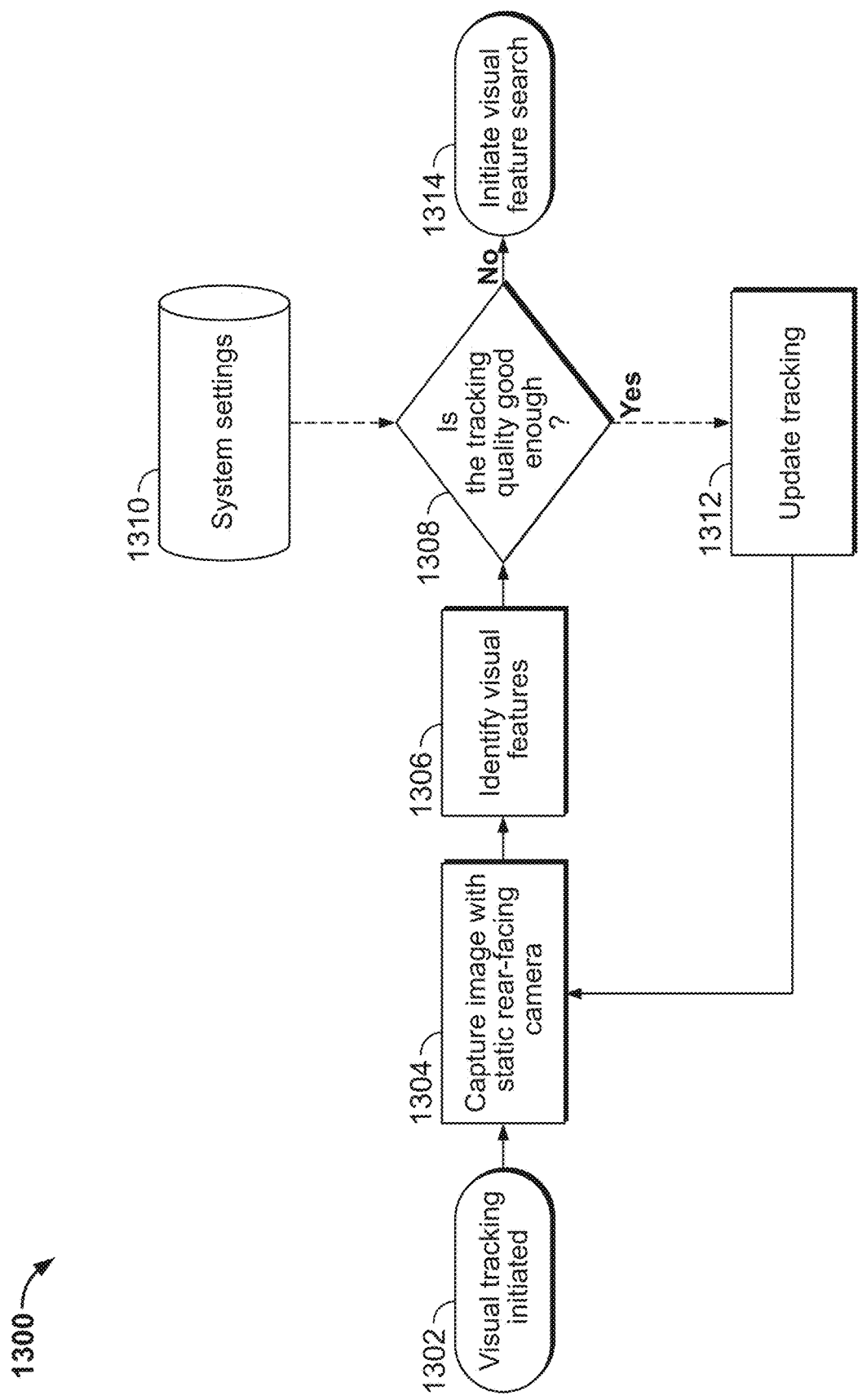
FIG. 13 is a flowchart of an illustrative process for positioning a virtual object, in accordance with some embodiments of this disclosure.
Figure 14:
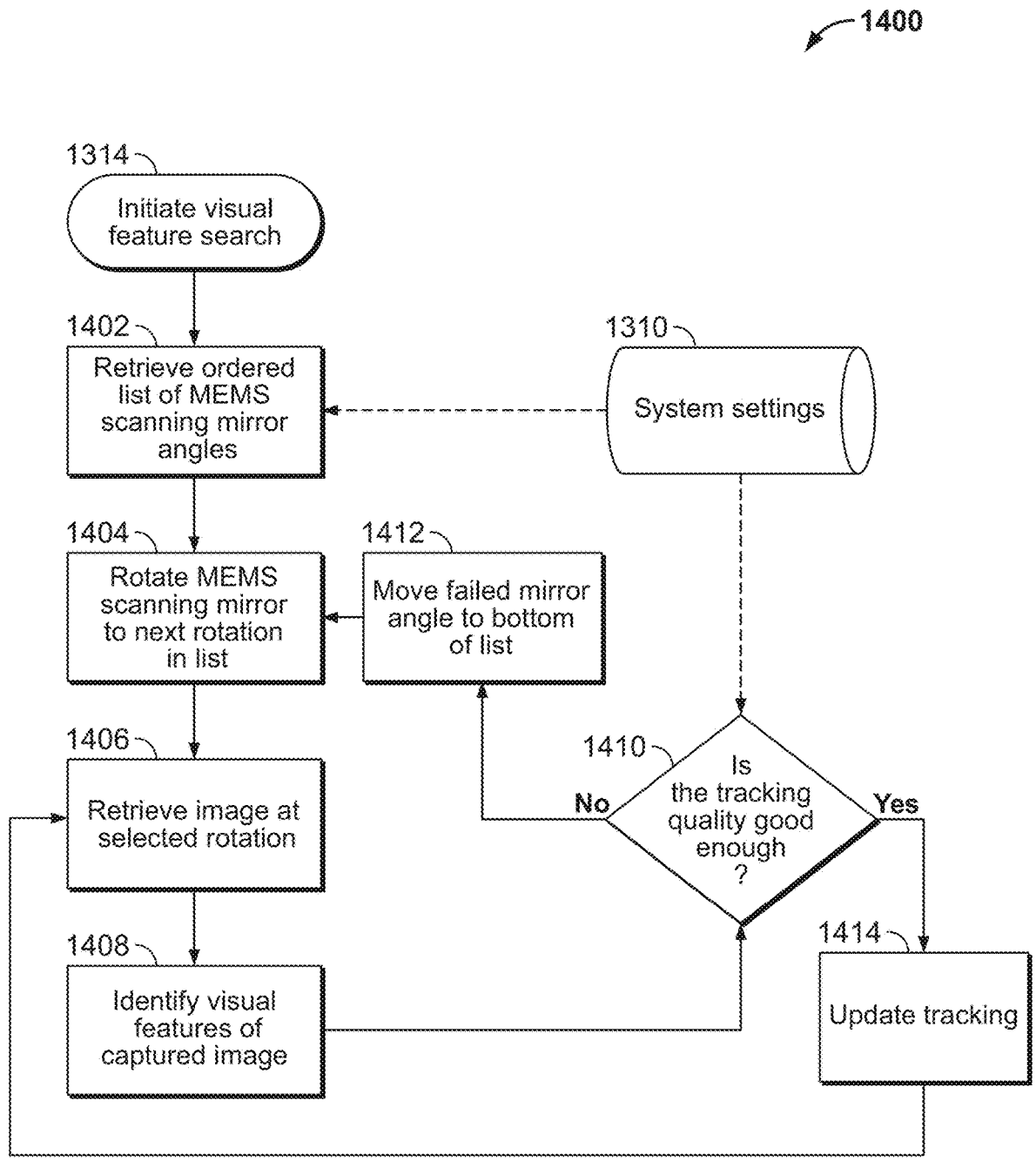
FIG. 14 is a flowchart of an illustrative process for determining and updating a list of best adjustable camera view direction angles for positioning a virtual object, in accordance with some embodiments of this disclosure.

FIGS. 13-14 illustrate flowcharts of a detailed illustrative processes 1300 and 1400 for improving visual tracking in environments with sparse or non-existent visual features, in accordance with some embodiments of this disclosure. In various embodiments, the individual steps of processes 1300 and 1400 may be implemented by one or more components of the devices, processes, and systems of FIGS. 1-12 and 15-17 and may be performed in combination with any of the other processes and aspects described herein. Although the present disclosure may describe certain steps of processes 1300 and 1400 (and of other processes described herein) as being implemented by certain components of the computing devices, processes and systems of FIGS. 1-12 and 15-17, this is for purposes of illustration only. It should be understood that other components of the computing devices, processes, and systems of FIGS. 1-12 and 15-17 may implement those steps instead.

At 1302, I/O circuitry (e.g., I/O circuitry 1602 of computing device 1600 of FIG. 16 and/or I/O circuitry 1712 of server 1704 of FIG. 17) may receive input to initiate visual tracking. The tracking may be for purposes of positioning a virtual object on an AR display. Such input may be received in any suitable form, e.g., as voice input, tactile input, input received via a keyboard or remote, input received via a touchscreen, text-based input, biometric input, or any other suitable input, or any combination thereof. In some embodiments, the input received at 1302 may correspond to receiving a selection of a video or imaging application provided by an operating system of (or an application installed on) the computing device and/or the camera interfacing with various components.

At 1304, control circuitry (e.g., control circuitry 1604 of computing device 1600 of FIG. 16 and/or control circuitry 1711 of server 1704 of FIG. 17) may capture an image using a static rear-facing camera of the device (e.g., camera 116, 430, 516, 616, 910, 1010, or 1110). In some examples, the device may capture multiple images using the static camera, At 1306, the control circuitry analyzes the image(s) captured by the static camera to identify visual features or positioning cues. This may include any number of image processing algorithms, and/or may include comparing multiple images taken over time to identify differences. Visual features may be used to determine a tracking quality associated with the first image and/or the static camera. The tracking quality may correspond to how well the device can track and/or position a virtual object on the screen given the FoV of the static camera and the positioning cues in the first image.

At 1308, the control circuitry determines whether the tracking quality (determined based on the visual features identified from the image captured by the static camera) is sufficient to track and/or position a virtual object. The determination of whether the tracking quality is sufficient may be based on system setting stored in storage 1310. The system settings may dictate how many positioning cues are needed, how the tracking quality is measured, what the tracking quality threshold(s) are, whether a particular virtual object requires more or fewer positioning cues, and/or various other aspects.

If the first image captured using the static camera does include sufficient positioning cues, and the tracking quality is deemed sufficient, the control circuitry may update the information used for tracking and/or positioning the virtual object, at step 1312. This may include updating the stored positions of the positioning cues, updating the placement of the virtual object, and/or otherwise using information determined from the image captured by the static camera to track and/or position the virtual object.

Alternatively, if the tracking quality determined based on the image captured by the static camera alone is deemed insufficient for purposes of tracking and/or positioning the virtual object, the control circuitry initiates a visual feature search at step 1314. The visual feature search may be understood as an attempt to expand the FoV used for tracking and/or virtual object positioning purposes to capture more of the environment than is visible in the static camera FoV, and is described in further detail with respect to FIG. 14.

FIG. 14 illustrates a process 1400 in connection with the process 1300, for carrying out a visual feature search according to embodiments of this disclosure. The visual feature search may enable the device to identify additional visual features or positioning cues for use in tracking and/or positioning virtual objects.

At 1402, control circuitry retrieves an ordered list of MEMS scanning mirror angles. The MEMS angles correspond to angles of the MEMS mirror of an adjustable camera (e.g., adjustable camera 118A, 118B, 302A, 302B, 402A, 402B, 518A, 518B, 618A, 618B, 920, 1020, and/or 1120). The list of MEMS angles may be predetermined based on scanning performed by the adjustable camera (described above with respect to FIG. 12), and may rank a plurality of possible MEMS mirror angles based on the number or quality of positioning cues available in images captured by the adjustable camera. In some examples, the ranking may be based on a measured number or quality of positioning cues, or may be based on an expected number or quality of positioning cues. The ordered list of MEMS angles may be retrieved from the system settings 1310.

At 1404, the control circuitry rotates the MEMS mirror corresponding to the adjustable camera to a first (or next) rotation angle on the ordered list. When step 1404 is performed for the first time after the visual feature search is initiated, the control circuitry may move the MEMS mirror to the first or top angle on the ordered list. Then, each time the process 1400 returns to step 1404, the control circuitry may rotate the MEMS mirror to the next best angle on the ordered list. As noted above, rotation of the MEMS mirror causes the adjustable camera view direction and FoV to change. As a result, the FoV of the adjustable camera includes portions of the environment that are not included in the static camera FoV.

At 1406, the adjustable camera captures an image at the current MEMS angle. And at 1408, the control circuitry processes the captured image to identify visual features present that can be used for tracking and/or virtual object positioning. This may include any number of image processing algorithms, and/or may include comparing multiple images taken over time to identify differences. The control circuitry may use the identified visual features to determine a tracking quality associated with the image. The tracking quality may correspond to how well the device can track and/or position a virtual object on the screen given the FoV of the adjustable camera at the current MEMS mirror angle.

At 1410, the control circuitry determines whether the tracking quality of image captured by the adjustable camera at the current MEMS mirror angle is good enough. This can include accessing one or more thresholds or other metrics from the system setting 1310. In some examples, this may include analyzing the tracking quality available from the adjustable camera alone. In other examples, this may include analyzing the tracking quality available from the adjustable camera in combination with the static camera.

If the tracking quality of the image from the adjustable camera is not good enough (i.e., the number or quality of positioning cues in the image is below a threshold, another metric of the image is below the value needed to perform accurate positioning using that image, feature mapping between frames becomes insufficient, etc.), the control circuitry updates the ordered list of MEMS mirror angles at step 1412. This can include moving the current angle (that resulted in the low tracking quality) down the list based on the determined tracking quality, to the bottom of the ranked list, off the ranked list entirely, or performing some other update to the ordered list. In some examples, other MEMS angles on the list may also be moved up or down the ranked list based on their similarity (or not) to the current MEMS angle. That is, if a first angle is deemed to result in images having low tracking quality, a second angle that is similar to the first angle may be assumed to result in images having low tracking quality as well. In this case, both angles may be moved down the ordered list. In some examples, the MEMS angles on the ordered list may be arranged according to a weighted calculation that is updated each time new information about a given MEMS angle is determined.

After updating the ordered list at step 1412, the process 1400 may proceed back to step 1404. The control circuitry may select the next angle (i.e., the next best MEMS angle that has been moved to the top of the list at step 1412), and may repeat steps 1404-1410 for the next angle. If the next angle also fails to provide sufficient tracking quality, process 1400 may again proceed to step 1412 to update the ordered list accordingly. Steps 1404-1412 may be repeated in a loop until a MEMS angle is found that provides sufficient tracking quality. Identifying a MEMS angle that results in sufficient tracking quality in this context may include determining a MEMS angle that results in images that provide greater than a threshold number of tracking cues, greater than a threshold quality of tracking cues, or some other metric that is greater than a threshold amount.

At 1410, once an angle is found that results in images having sufficient positioning cues (i.e., the tracking quality is good enough), the control circuitry updates the tracking information used by the device to track and/or position the virtual object. This may include updating the stored positions of the positioning cues, updating the placement of the virtual object, and/or otherwise using information determined from the image captured by the adjustable camera at the current MEMS angle to track and/or position the virtual object.

The process 1400 may then proceed back to step 1406, to repeat steps 1406-1414 so long as the current angle produces images that result in a good tracking quality. If the tracking quality of the current angle falls below the threshold, the process proceeds to steps 1412 and then 1404 to update the ranked list of MEMS mirror angles and select the next best angle for image capture and tracking. Process 1400 may continue so long as the virtual object is being displayed. Process 1400 may end when the user selects an option to stop display of the virtual object, turns off the device, or otherwise ends the process.

Figure 15:
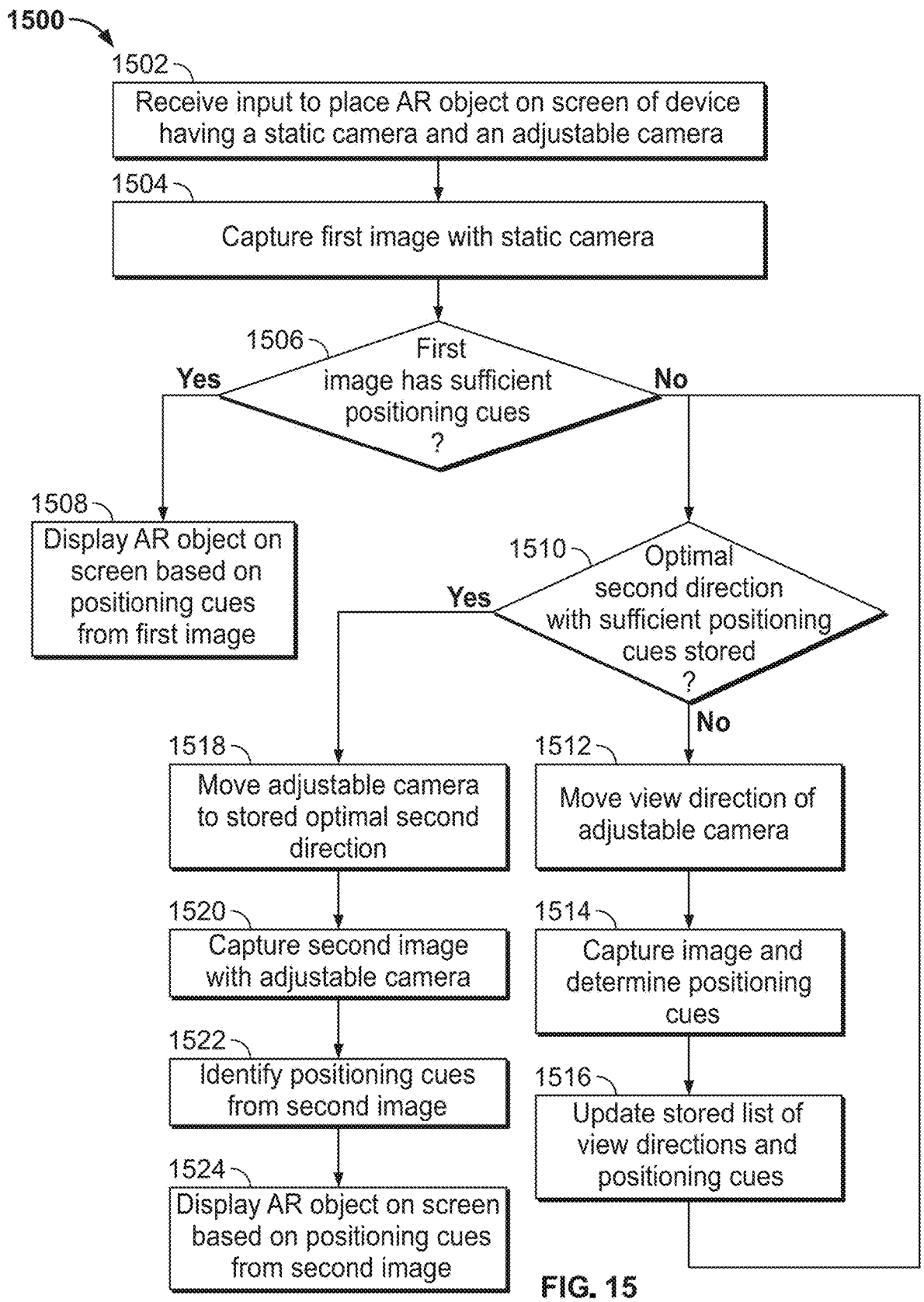
FIG. 15 is a flowchart of an illustrative process for positioning a virtual object, in accordance with some embodiments of this disclosure.

FIG. 15 illustrates a flowchart of a detailed illustrative processes 1500 for tracking and positioning a virtual object, in accordance with some embodiments of this disclosure. In various embodiments, the individual steps of process 1500 may be implemented by one or more components of the computing devices, processes, and systems of FIGS. 1-14 and 16-17 and may be performed in combination with any of the other processes and aspects described herein. Although the present disclosure may describe certain steps of process 1500 (and of other processes described herein) as being implemented by certain components of the computing devices, processes and systems of FIGS. 1-14 and 16-17, this is for purposes of illustration only. It should be understood that other components of the computing devices, processes, and systems of FIGS. 1-14 and 16-17 may implement those steps instead.

At 1502, I/O circuitry (e.g., I/O circuitry 1602 of computing device 1600 of FIG. 16 and/or I/O circuitry 1712 of server 1704 of FIG. 17) may receive input to initiate visual tracking or positioning of a virtual object on a screen of a device having a static camera and an adjustable camera. Such input may be received in any suitable form, e.g., as voice input, tactile input, input received via a keyboard or remote, input received via a touchscreen, text-based input, biometric input, or any other suitable input, or any combination thereof. In some embodiments, the input received at 1502 may correspond to receiving a selection of a video or imaging application provided by an operating system of (or an application installed on) the computing device and/or the camera interfacing with various components.

At 1504, control circuitry (e.g., control circuitry 1604 of computing device 1600 of FIG. 16 and/or control circuitry 1711 of server 1704 of FIG. 17) may cause the static camera to capture an image (e.g., static camera 116, 430, 516, 616, 910, 1010, or 1110).

At 1506, the control circuitry determines whether the first image captured by the static camera has sufficient positioning cues to position the virtual object on the display. This can include performing image processing on the first image to identify visual features or positioning cues, and comparing to one or more thresholds needed for positioning the virtual object. As noted above, the threshold(s) may be part of the system settings, and may be different depending on the application. For example, in some applications the tracking threshold may be very low, meaning that the virtual object may be displayed even if there are only a relatively small number of positioning cues. In other applications, the threshold may be higher, and a greater accuracy or number of positioning cues may be required for positioning the virtual object.

At 1508, if the control circuitry determines that there are sufficient positioning cues in the first image captured by the static camera, the I/O circuitry displays the virtual object on the screen in a position based on the positioning cues from the first image.

At 1510, if the control circuitry determines that there are not sufficient positioning cues in the first image captured by the static camera, the control circuitry determines whether there is a stored direction or angle for the adjustable camera to use to capture an image with a greater number of positioning cues. That is, the control circuitry determines whether there is a known angle for the adjustable camera to be directed in to capture sufficient positioning cues for positioning the virtual object.

At 1512, if there is no stored optimal direction for the adjustable camera to be directed in to capture sufficient positioning cues, the control circuitry moves the view direction of the adjustable camera. This may include moving the view direction of the adjustable camera away from the static camera view direction (i.e., horizontally, vertically, etc.). In some examples, this movement may be predetermined based on a scanning pattern (e.g., the scanning patterns described above with respect to FIG. 12). In other examples, the movement may be random, and/or may be based on some other factor (i.e., lighting sensor indicating better lighting in a particular direction, etc.)

At 1514, the control circuitry controls the adjustable camera to capture an image, and processes the image to identify the visual features or positioning cues. And at 1516, the control circuitry updates the list of MEMS mirror angles and corresponding suitability for use in positioning a virtual object. The process 1500 then proceeds back to step 1510. If no MEMS mirror angle yet attempted by the adjustable camera is deemed sufficient for positioning the virtual object, the process 1500 repeats steps 1510-1516 with additional MEMS mirror angles (or adjustable camera view directions) until an angle or direction is found that provides sufficient positioning cues.

Once an adjustable camera view direction that provides sufficient positioning cues is identified, process 1500 proceeds to step 1518. At 1518, the control circuitry moves the adjustable camera to the stored optimal second direction that results in images from the adjustable camera that provide sufficient positioning cues.

At 1520, the adjustable camera captures an image while pointing in the optimal second direction. At 1522, the control circuitry processes the captured image to identify positioning cues. And at 1524, the I/O circuitry displays the virtual object on a display of the device using positioning cues from the image captured by either the adjustable camera alone, or both the adjustable camera and the static camera. The process 1500 may then continue to capture images using the adjustable camera pointed in the optimal second direction, and may continue to position the virtual object using positioning cues from these captured images. The process 1500 may continue so long as the virtual object is being displayed, and may end when the user selects an option to stop display of the virtual object, turns off the device, or otherwise ends the process.

In some examples, the functions described above may be performed without the use of a static camera. The adjustable camera may be used to capture the initial image as well as scanning for additional images. In this case, a single camera (e.g., adjustable camera 118A, 118B, 302A, 302B, 402A, 402B, 518A, 518B, 618A, 618B, 920, 1020, and/or 1120), serves the dual purpose of scene display and feature tracking. Unlike the two-camera setup described above, where the roles are distinctly divided, the single-camera system may continually switch between the two tasks, thus making optimal use of the MEMS mirror's dynamic adjustability. The adjustable camera, with the MEMS scanning mirror at its original or default rotation position, captures the scene for display. Simultaneously, the adjustable camera performs the initial visual tracking based on the visual features or positioning cues in its field of view. This operation is quite similar to the role of the primary camera or static camera in the dual-camera setup described above. However, when the adjustable camera faces an area of the environment with sparse visual features, the system initiates a different procedure than described above. In this case, the MEMS scanning mirror switches from its default position, thereby changing the adjustable camera's FoV. This action is similar to the scanning process described above that is performed using the adjustable camera, where the MEMS mirror adjusts its angle to find a view direction for the adjustable camera that provides a sufficient number of trackable visual features. When the adjustable camera arrives at a view direction that offers a sufficient number of trackable visual features, it holds that angle for a short duration, for example, a duration long enough to capture one frame. During this period, the adjustable camera, now acting as a virtual camera with a distinct optical center and field of view, captures images and tracks visual features in this new field of view. These images exclusively serve the purpose of feature tracking. At the same time that the additional images are captured by the adjustable camera, to ensure a steady visual display, the system schedules display intervals where the MEMS scanning mirror returns to its original or default position. During these intervals, the camera captures images for scene display. This time-sharing strategy ensures that the system maintains a steady visual output (based on the adjustable camera capturing images in the default position), while continuously adapting to the varying feature availability in its environment. Like the dual-camera system, a calibration process may pre-define transformations between the adjustable camera's 3D world frame at the default MEMS mirror position and the world frames corresponding to other MEMS mirror positions. These transformations enable consistent tracking output, even as the MEMS mirror angle and the adjustable camera's FoV change dynamically.

In some examples, the device may analyze images captured by one or more of the cameras to identify the center of a cluster of visual features. If the feature cluster provides sufficiently stable tracking, the system may identify when that cluster is approaching the edge of the adjustable camera FoV. When this happens, the device may update the MEMS scanning mirror position to center the cluster of visual features (or as close as possible given the physical limitations of the MEMS scanning mirror). This ensures that the tracking quality remains sufficient, and the system can handle changes in the device position or orientation while keeping the adjustable camera pointed in a direction that provides sufficient positioning cues.

In some examples, the device may use previously captured images to determine an estimate or prediction for where to direct the adjustable camera to provide additional positioning cues. The device may analyze images of the environment previously captured (e.g., from previous instances where the user was present in the environment) to predict where in the environment the adjustable camera is currently most likely to capture images that provide sufficient positioning cues.

In some examples, the functions described herein may be used not only for positioning a virtual object, but also for tracking movement of an object in the FoV of one or more cameras, tracking movement of the device itself, or any other technology or functionality that relies on visual odometry. This includes applications related to autonomy, robotics, and virtual and augmented reality.

Figure 16:
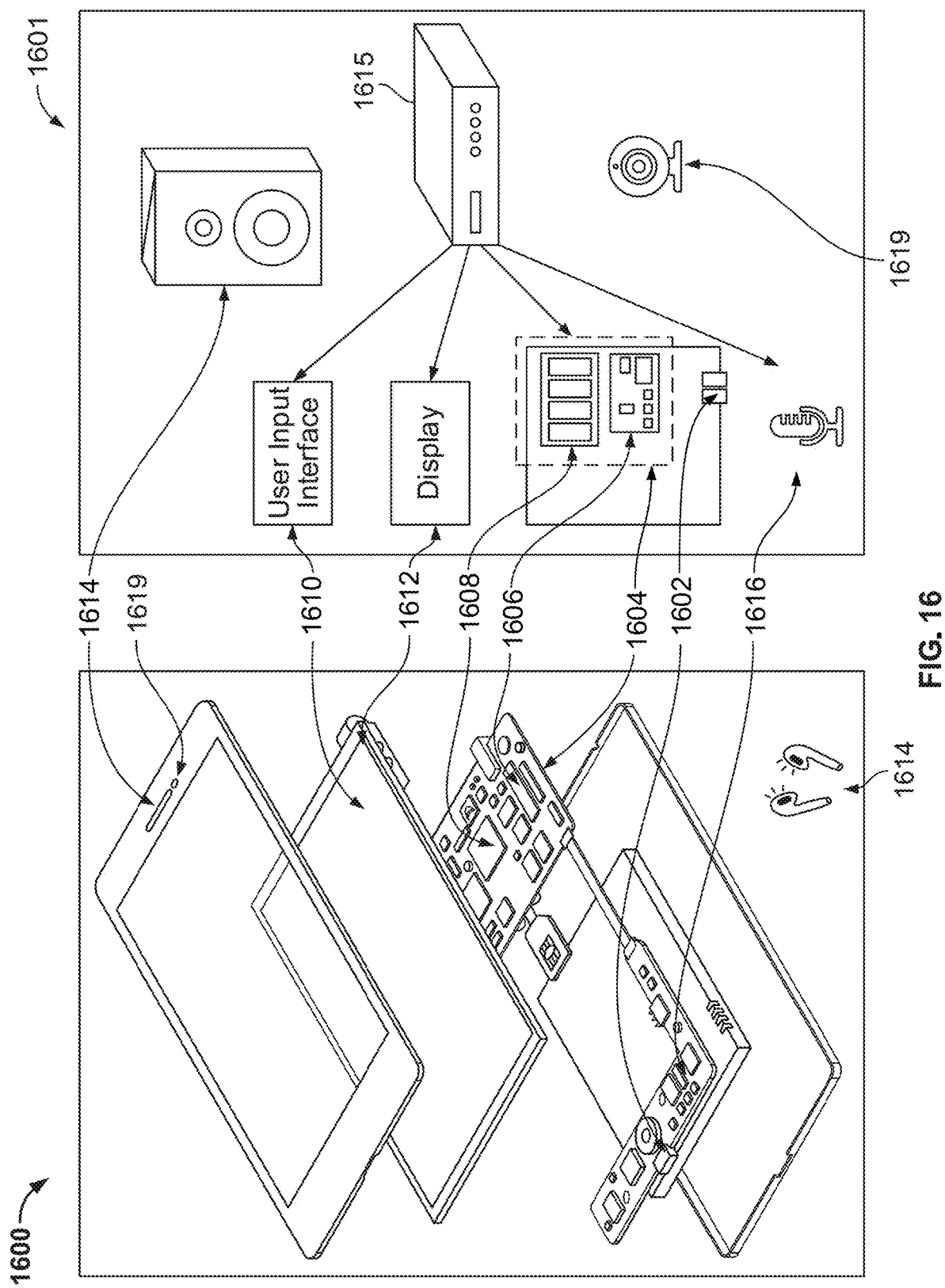
FIGS. 16-17 depict illustrative devices, systems, servers, and related hardware for taking a panoramic image and/or positioning a virtual object, in accordance with some embodiments of this disclosure.
Figure 17:
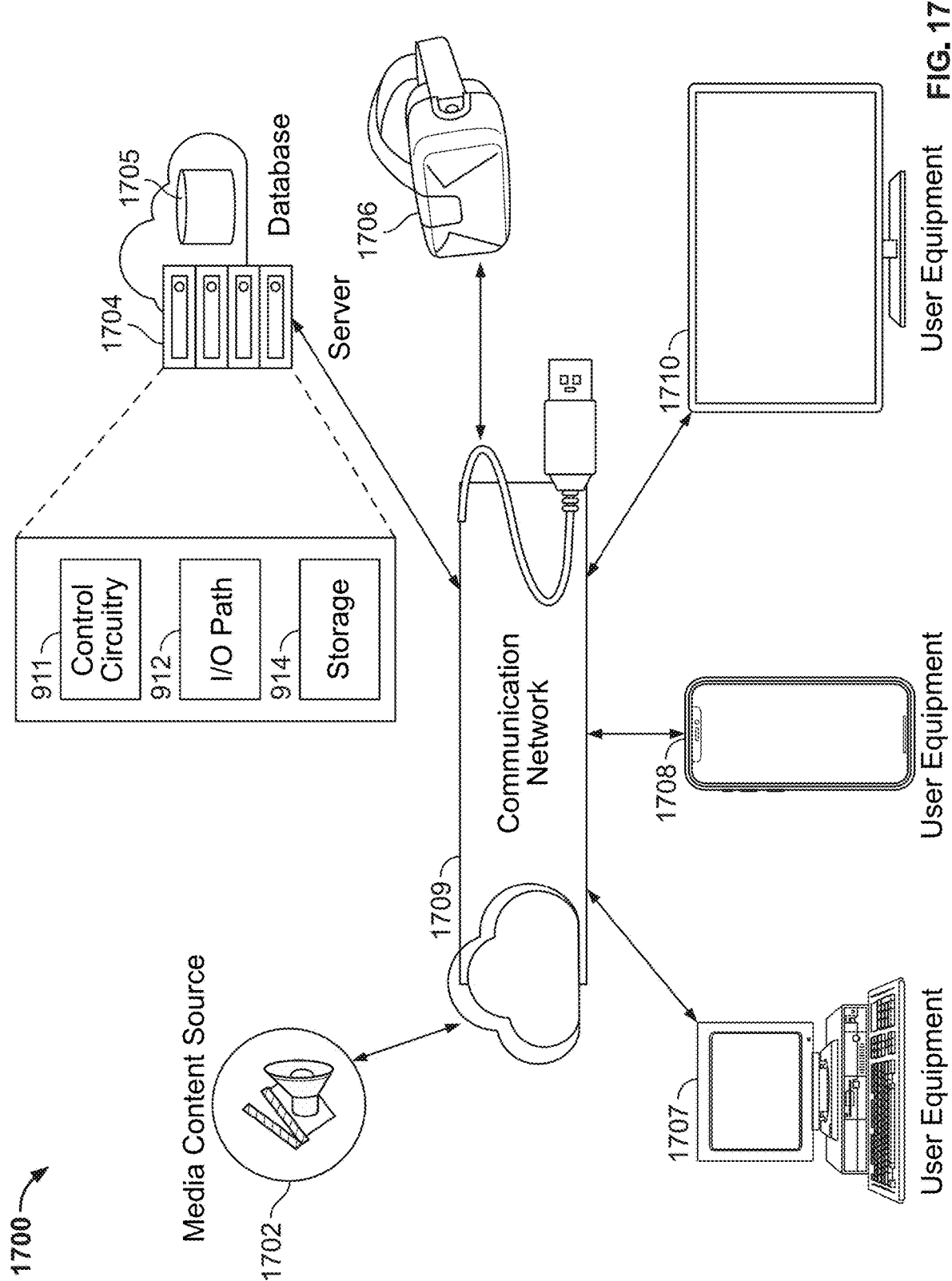

FIGS. 16-17 depict illustrative devices, systems, servers, and related hardware for performing the functions described in this disclosure, such as capturing wide FoV images using multiple cameras, and positioning virtual objects, in accordance with some embodiments of this disclosure. FIG. 16 shows generalized embodiments of illustrative computing devices 1600 and 1601, which may correspond to, e.g., computing device 110, 510, 610, 900, 1100, and 1200, and/or any of the static or adjustable cameras described above with respect to FIGS. 1-15. For example, computing device 1600 may be: a camera; a smartphone device; a tablet; a near-eye display device; a VR or AR device; a head-mounted computing device; a mobile device; or any other suitable device capable of capturing video and/or processing captured video and/or adjusting captured settings; or any combination thereof. In another example, computing device 1601 may be a user television equipment system or device. Computing device 1601 may include set-top box 1615. Set-top box 1615 may be communicatively connected to microphone 1616, audio output equipment (e.g., speaker or headphones 1614), and display 1612. In some embodiments, display 1612 may be a television display or a computer display. In some embodiments, set-top box 1615 may be communicatively connected to user input interface 1610. In some embodiments, user input interface 1610 may be a remote control device. Set-top box 1615 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 17. In some embodiments, computing device 1600 may comprise any suitable number of sensors (e.g., gyroscope or gyrometer, or accelerometer, etc.), and/or a GPS module (e.g., in communication with one or more servers and/or cell towers and/or satellites) to ascertain a location and/or orientation of computing device 1600. In some embodiments, computing device 1600 comprises a rechargeable battery that is configured to provide power to the components of the computing device.

Each one of computing device 1600 and computing device 1601 may receive content and data via input/output (I/O) path 1602. I/O path 1602 may provide content (e.g., broadcast programming, on-demand programming, Internet content, content available over a local area network (LAN) or wide area network (WAN), and/or other content) and data to control circuitry 1604, which may comprise processing circuitry 1606 and storage 1608. Control circuitry 1604 may be used to send and receive commands, requests, and other suitable data using I/O path 1602, which may comprise I/O circuitry. I/O path 1602 may connect control circuitry 1604 (and specifically processing circuitry 1606) to one or more communications paths (described below). I/O functions may be provided by one or more of these communications paths, but are shown as a single path in FIG. 16 to avoid overcomplicating the drawing. While set-top box 1615 is shown in FIG. 16 for illustration, any suitable computing device having processing circuitry, control circuitry, and storage may be used in accordance with the present disclosure. For example, set-top box 1615 may be replaced by, or complemented by, a personal computer (e.g., a notebook, a laptop, a desktop), a smartphone (e.g., computing device 1600), an AR or VR device, a tablet, a network-based server hosting a user-accessible client device, a non-user-owned device, any other suitable device, or any combination thereof.

Control circuitry 1604 may be based on any suitable control circuitry such as processing circuitry 1606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1604 executes instructions for the image capture application stored in memory (e.g., storage 1608). Specifically, control circuitry 1604 may be instructed by the image capture application to perform the functions discussed above and below. In some implementations, processing or actions performed by control circuitry 1604 may be based on instructions received from the image capture application.

In client/server-based embodiments, control circuitry 1604 may include communications circuitry suitable for communicating with a server or other networks or servers. The image capture application may be a stand-alone application implemented on a computing device or a server. The image capture application may be implemented as software or a set of executable instructions. The instructions for performing any of the embodiments discussed herein of the image capture application may be encoded on non-transitory computer-readable media (e.g., a hard drive, random-access memory on a DRAM integrated circuit, read-only memory on a BLU-RAY disk, etc.). For example, in FIG. 16, the instructions may be stored in storage 1608, and executed by control circuitry 1604 of a computing device 1600.

In some embodiments, the image capture application may be a client/server application where only the client application resides on computing device 1600 (e.g., computing device 110 of FIG. 1 or 900 of FIG. 9), and a server application resides on an external server (e.g., server 1704 of FIG. 17). For example, the image capture application may be implemented partially as a client application on control circuitry 1604 of computing device 1600 and partially on server 1704 as a server application running on control circuitry 1711. Server 1704 may be a part of a local area network with one or more of computing devices 1600, 1601 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 1704 and/or an edge computing device), referred to as "the cloud." Computing device 1600 may be a cloud client that relies on the cloud computing capabilities from server 1704 to carry out the functions described herein. When executed by control circuitry of server 1704, the image capture application may instruct control circuitry 1611 to perform such tasks. The client application may instruct control circuitry 1604 to perform such tasks.

Control circuitry 1604 may include communications circuitry suitable for communicating with a video communication or video conferencing server, content servers, social networking servers, video gaming servers, edge computing systems and devices, a table or database server, or other networks or servers. The instructions for carrying out the above mentioned functionality may be stored on a server (which is described in more detail in connection with FIG. 17). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 17). In addition, communications circuitry may include circuitry that enables peer-to-peer communication of computing devices, or communication of computing devices in locations remote from each other (described in more detail below).

Memory may be an electronic storage device provided as storage 1608 that is part of control circuitry 1604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1608 may be used to store various types of content described herein as well as image capture application data described above. Nonvolatile memory may also be used (e.g., to launch a boot-up routine and other instructions). Cloud-based storage, described in relation to FIG. 16, may be used to supplement storage 1608 or instead of storage 1608.

Control circuitry 1604 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 1604 may also include scaler circuitry for upconverting and downconverting content into the preferred output format of computing device 1600. Control circuitry 1604 may also include digital-to-analog converter circuitry and analog-to-digital converter circuitry for converting between digital and analog signals. The tuning and encoding circuitry may be used by computing device 1600, 1601 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1608 is provided as a separate device from computing device 1600, the tuning and encoding circuitry (including multiple tuners) may be associated with storage 1608.

Control circuitry 1604 may receive instruction from a user by way of user input interface 1610. User input interface 1610 may be any suitable user interface, such as a remote control, mouse, trackball, keypad, keyboard, touch screen, touchpad, stylus input, joystick, voice recognition interface, or other user input interfaces. Display 1612 may be provided as a stand-alone device or integrated with other elements of each one of computing device 1600 and computing device 1601. For example, display 1612 may be a touchscreen or touch-sensitive display. In such circumstances, user input interface 1610 may be integrated with or combined with display 1612. In some embodiments, user input interface 1610 includes a remote-control device having one or more microphones, buttons, keypads, or any other components configured to receive user input or combinations thereof. For example, user input interface 1610 may include a handheld remote-control device having an alphanumeric keypad and option buttons. In a further example, user input interface 1610 may include a handheld remote-control device having a microphone and control circuitry configured to receive and identify voice commands and transmit information to set-top box 1615.

Audio output equipment 1614 may be integrated with or combined with display 1612. Display 1612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card or graphical processing unit (GPU) may generate the output to display 1612. Audio output equipment 1614 may be provided as integrated with other elements of each one of computing device 1600 and computing device 1601 or may be stand-alone units. An audio component of videos and other content displayed on display 1612 may be played through speakers (or headphones) of audio output equipment 1614. In some embodiments, audio may be distributed to a receiver (not shown), which processes and outputs the audio via speakers of audio output equipment 1614. In some embodiments, for example, control circuitry 1604 is configured to provide audio cues to a user, or other audio feedback to a user, using speakers of audio output equipment 1614. There may be a separate microphone 1616 or audio output equipment 1614 may include a microphone configured to receive audio input such as voice commands or speech. For example, a user may speak letters or words that are received by the microphone and converted to text by control circuitry 1604. In a further example, a user may voice commands that are received by a microphone and recognized by control circuitry 1604. Camera 1619 may be any suitable video camera integrated with the equipment or externally connected. Camera 1619 may be a digital camera comprising a charge-coupled device (CCD) and/or a complementary metal-oxide semiconductor (CMOS) image sensor, which may correspond to image sensors 120A, 120B, 310A, 310B, 410A, 410B, 430 1012, or 1022. In some embodiments, camera 1619 may be an analog camera that converts to digital images via a video card. In some embodiments, camera 1619 may correspond to any of the cameras disclosed herein (static or adjustable) and may comprise an image sensor, lenses, MEMS scanning mirror, and/or any other suitable optical components, or any combination thereof.

The image capture application may be implemented using any suitable architecture. For example, it may be a stand-alone application wholly implemented on each one of computing device 1600 and computing device 1601. In such an approach, instructions of the application may be stored locally (e.g., in storage 1608), and data for use by the application is downloaded on a periodic basis (e.g., from an out-of-band feed, from an Internet resource, or using another suitable approach). Control circuitry 1604 may retrieve instructions of the application from storage 1608 and process the instructions to provide video conferencing functionality and generate any of the displays discussed herein. Based on the processed instructions, control circuitry 1604 may determine what action to perform when input is received from user input interface 1610. For example, movement of a cursor on a display up/down may be indicated by the processed instructions when user input interface 1610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 1604 may allow a user to provide user profile information or may automatically compile user profile information. For example, control circuitry 1604 may access and monitor network data, video data, audio data, processing data, participation data from a conference participant profile. Control circuitry 1604 may obtain all or part of other user profiles that are related to a particular user (e.g., via social media networks), and/or obtain information about the user from other sources that control circuitry 1604 may access. As a result, a user can be provided with a unified experience across the user's different devices.

In some embodiments, the image capture application is a client/server-based application. Data for use by a thick or thin client implemented on each one of computing device 1600 and computing device 1601 may be retrieved on-demand by issuing requests to a server remote to each one of computing device 1600 and computing device 1601. For example, the remote server may store the instructions for the application in a storage device. The remote server may process the stored instructions using circuitry (e.g., control circuitry 1604) and generate the displays discussed above and below. The client device may receive the displays generated by the remote server and may display the content of the displays locally on computing device 1600. This way, the processing of the instructions is performed remotely by the server while the resulting displays (e.g., that may include text, a keyboard, or other visuals) are provided locally on computing device 1600. Computing device 1600 may receive inputs from the user via input interface 1610 and transmit those inputs to the remote server for processing and generating the corresponding displays. For example, computing device 1600 may transmit a communication to the remote server indicating that an up/down button was selected via input interface 1610. The remote server may process instructions in accordance with that input and generate a display of the application corresponding to the input (e.g., a display that moves a cursor up/down). The generated display may then be transmitted to computing device 1600 for presentation to the user.

In some embodiments, the image capture application may be downloaded and interpreted or otherwise run by an interpreter or virtual machine (run by control circuitry 1604). In some embodiments, the image capture application may be encoded in the ETV Binary Interchange Format (EBIF), received by control circuitry 1604 as part of a suitable feed, and interpreted by a user agent running on control circuitry 1604. For example, the image capture application may be an EBIF application. In some embodiments, the image capture application may be defined by a series of JAVA-based files that are received and run by a local virtual machine or other suitable middleware executed by control circuitry 1604. In some of such embodiments (e.g., those employing MPEG-2, MPEG-4, HEVC or any other suitable digital media encoding schemes), image capture application may be, for example, encoded and transmitted in an MPEG-2 object carousel with the MPEG audio and video packets of a program.

As shown in FIG. 17, devices 1706, 1707, 1708, and 1710 may be coupled to communication network 1709. In some embodiments, each of computing devices 1706, 1707, 1708, and 1710 may correspond to one of computing devices 1600 or 1601 of FIG. 16, and/or the other devices or cameras disclosed herein. Computing device 1706 is a head-mounted computing device. Communication network 1709 may be one or more networks including the Internet, a mobile phone network, mobile, voice or data network (e.g., a 5G, 4G, or LTE network), cable network, public switched telephone network, or other types of communication network or combinations of communication networks. Paths (e.g., depicted as arrows connecting the respective devices to the communication network 1709) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 17 to avoid overcomplicating the drawing.

Although communications paths are not drawn between computing devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The computing devices may also communicate with each other directly through an indirect path via communication network 1709.

System 1700 may comprise media content source 1702, one or more servers 1704, and/or one or more edge computing devices. In some embodiments, the image capture application may be executed at one or more of control circuitry 1711 of server 1704 (and/or control circuitry of computing devices 1706, 1707, 1708, 1710 and/or control circuitry of one or more edge computing devices). In some embodiments, media content source 1702 and/or server 1704 may be configured to host or otherwise facilitate communication sessions between computing devices 1706, 1707, 1708, 1710 and/or any other suitable devices, and/or host or otherwise be in communication (e.g., over network 1709) with one or more social network services.

In some embodiments, server 1704 may include control circuitry 1711 and storage 1714 (e.g., RAM, ROM, Hard Disk, Removable Disk, etc.). Storage 1714 may store one or more databases. Server 1704 may also include an input/output path 1712. I/O path 1712 may provide video conferencing data, device information, or other data, over a local area network (LAN) or wide area network (WAN), and/or other content and data to control circuitry 1711, which may include processing circuitry, and storage 1714. Control circuitry 1711 may be used to send and receive commands, requests, and other suitable data using I/O path 1712, which may comprise I/O circuitry. I/O path 1712 may connect control circuitry 1711 (and specifically control circuitry) to one or more communications paths.

Control circuitry 1711 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1711 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1711 executes instructions for an emulation system application stored in memory (e.g., the storage 1714). Memory may be an electronic storage device provided as storage 1714 that is part of control circuitry 1711.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving an indication to place an augmented reality (AR) object on a screen of a device comprising a static camera having a static view direction and at least one adjustable camera having an adjustable view direction;
   capturing a first image using the static camera;
   in response to determining that the first image lacks sufficient positioning cues for placement of the AR object:
      moving the adjustable view direction of the at least one adjustable camera from a first direction to a second direction; and
      capturing a second image using the at least one adjustable camera in the second direction; and
   generating for display on the screen of the device the AR object in a position on the screen of the device determined at least in part based on positioning cues from the second image.

2. The method of claim 1, wherein the adjustable view direction of the at least one adjustable camera is based on an orientation of a micro-electro-mechanical system (MEMS) mirror, and wherein moving the adjustable view direction of the at least one adjustable camera comprises:
   controlling the MEMS mirror to change from a first orientation to a second orientation.

3. The method of claim 1, further comprising determining the second direction of the at least one adjustable camera by moving the at least one adjustable camera in a random direction.

4. The method of claim 1, further comprising:
   determining that a combination of (i) the first image captured by the static camera and (ii) the second image captured by the at least one adjustable camera in the second direction includes sufficient positioning cues for placement of the AR object; and
   storing the second direction.

5. The method of claim 4, further comprising:
   in response to receiving a second indication to place a second AR object on the screen of the device:
      moving the adjustable view direction of the at least one adjustable camera to the stored second direction;
      capturing a third image using the at least one adjustable camera directed in the stored second direction; and
      generating for display the second AR object in a second position on the screen of the device determined at least in part based on positioning cues from the third image.

6. The method of claim 4, further comprising:
   moving the device from a first location to a second location;
   determining a difference between the first location and the second location using dead reckoning based on one of inertial sensors or GPS; and
   in response to receiving a second indication to place a second AR object on the screen of the device located in the second location:
      moving the adjustable view direction of the at least one adjustable camera to a third direction, wherein the third direction is based on the stored second direction and the difference between the first location and the second location; and
capturing a third image using the at least one adjustable camera in the third direction; and
generating for display the second AR object in a second position on the screen of the device determined at least in part based on positioning cues from the third image.

7. The method of claim 1, wherein moving the adjustable view direction of the at least one adjustable camera comprises:
sampling a plurality of different view directions of the at least one adjustable camera; and
storing the plurality of different view directions in a ranked list, wherein the plurality of different view directions are ranked based on a number of positioning cues detectable in images captured by the at least one adjustable camera when positioned in each respective view direction of the plurality of different view directions.

8. The method of claim 7, wherein moving the adjustable view direction of the at least one adjustable camera further comprises:
selecting a best ranked view direction of the plurality of different view directions stored in the ranked list; and
moving the adjustable view direction of the at least one adjustable camera to the best ranked view direction.

9. The method of claim 1, wherein moving the adjustable view direction of the at least one adjustable camera comprises:
rotating the adjustable view direction of the at least one adjustable camera between the second direction and a plurality of additional view directions;
capturing images using the at least one adjustable camera in each of the second direction and the plurality of additional view directions; and
in response to determining that a third direction of the plurality of additional view directions provides a greater number of positioning cues than the second direction, capturing the second image using the at least one adjustable camera in the third direction.

10. The method of claim 1, further comprising:
determining that the first image captured by the static camera includes sufficient positional cues for positioning the AR object on the screen of the device; and
moving the adjustable view direction of the at least one adjustable camera such that a field of view of the at least one adjustable camera is outside the field of view of the static camera.

11. A system comprising:
input/output circuitry configured to receive an indication to place an augmented reality (AR) object on a screen of a device comprising a static camera having a static view direction and at least one adjustable camera having an adjustable view direction; and
control circuitry configured to:
capture a first image using the static camera;
in response to determining that the first image lacks sufficient positioning cues for placement of the AR object:
move the adjustable view direction of the at least one adjustable camera from a first direction to a second direction; and
capture a second image using the at least one adjustable camera in the second direction; and
generate for display on the screen of the device the AR object in a position on the screen of the device determined at least in part based on positioning cues from the second image.

12. The system of claim 11, wherein the adjustable view direction of the at least one adjustable camera is based on an orientation of a micro-electro-mechanical system (MEMS) mirror, and wherein the control circuitry is further configured to move the adjustable view direction of the at least one adjustable camera by controlling the MEMS mirror to change from a first orientation to a second orientation.

13. The system of claim 11, wherein the control circuitry is further configured to determine the second direction of the at least one adjustable camera by moving the at least one adjustable camera in a random direction.

14. The system of claim 11, wherein the control circuitry is further configured to:
determine that a combination of (i) the first image captured by the static camera and (ii) the second image captured by the at least one adjustable camera in the second direction includes sufficient positioning cues for placement of the AR object; and
store the second direction.

15. The system of claim 14, wherein the control circuitry is further configured to:
in response to receiving a second indication to place a second AR object on the screen of the device:
move the adjustable view direction of the at least one adjustable camera to the stored second direction;
capture a third image using the at least one adjustable camera directed in the stored second direction; and
generate for display the second AR object in a second position on the screen of the device determined at least in part based on positioning cues from the third image.

16. The system of claim 14, wherein the control circuitry is further configured to:
move the device from a first location to a second location;
determine a difference between the first location and the second location using dead reckoning based on one of inertial sensors or GPS; and
in response to receiving a second indication to place a second AR object on the screen of the device located in the second location:
move the adjustable view direction of the at least one adjustable camera to a third direction, wherein the third direction is based on the stored second direction and the difference between the first location and the second location; and
capture a third image using the at least one adjustable camera in the third direction; and
generate for display the second AR object in a second position on the screen of the device determined at least in part based on positioning cues from the third image.

17. The system of claim 11, wherein the control circuitry is further configured to move the adjustable view direction of the at least one adjustable camera by:
sampling a plurality of different view directions of the at least one adjustable camera; and
storing the plurality of different view directions in a ranked list, wherein the plurality of different view directions are ranked based on a number of positioning cues detectable in images captured by the at least one adjustable camera when positioned in each respective view direction of the plurality of different view directions.

18. The system of claim 17, wherein the control circuitry is further configured to move the adjustable view direction of the at least one adjustable camera by:
  selecting a best ranked view direction of the plurality of different view directions stored in the ranked list; and
  moving the adjustable view direction of the at least one adjustable camera to the best ranked view direction.

19. The system of claim 11, wherein the control circuitry is further configured to move the adjustable view direction of the at least one adjustable camera by:
  rotating the adjustable view direction of the at least one adjustable camera between the second direction and a plurality of additional view directions;
  capturing images using the at least one adjustable camera in each of the second direction and the plurality of additional view directions; and
  in response to determining that a third direction of the plurality of additional view directions provides a greater number of positioning cues than the second direction, capturing the second image using the at least one adjustable camera in the third direction.

20. The system of claim 11, wherein the control circuitry is further configured to:
  determine that the first image captured by the static camera includes sufficient positional cues for positioning the AR object on the screen of the device; and
  move the adjustable view direction of the at least one adjustable camera such that a field of view of the at least one adjustable camera is outside the field of view of the static camera.

* * * * *